US012590545B2

(12) United States Patent
Danno et al.

(10) Patent No.: US 12,590,545 B2
(45) Date of Patent: Mar. 31, 2026

(54) METHOD FOR MANUFACTURING SEAL RING, METHOD FOR ASSEMBLING TURBINE, AND TURBINE

(71) Applicant: MITSUBISHI HEAVY INDUSTRIES, LTD., Tokyo (JP)

(72) Inventors: Shohei Danno, Yokohama (JP); Hideaki Sato, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 198 days.

(21) Appl. No.: 18/269,833

(22) PCT Filed: Mar. 28, 2022

(86) PCT No.: PCT/JP2022/014898
§ 371 (c)(1),
(2) Date: Jun. 27, 2023

(87) PCT Pub. No.: WO2022/210501
PCT Pub. Date: Oct. 6, 2022

(65) Prior Publication Data

US 2024/0060424 A1 Feb. 22, 2024

(30) Foreign Application Priority Data

Mar. 30, 2021 (JP) ................................ 2021-057965

(51) Int. Cl.
*F01D 11/16* (2006.01)

(52) U.S. Cl.
CPC .......... *F01D 11/16* (2013.01); *F05D 2230/51* (2013.01); *F05D 2240/59* (2013.01)

(58) Field of Classification Search
CPC .... F16J 15/3284; F16J 15/3292; F01D 11/16; F05D 2230/51; F05D 2240/59
See application file for complete search history.

(56) References Cited

U.S. PATENT DOCUMENTS

| | | | | |
|---|---|---|---|---|
| 3,124,502 A * | 3/1964 | Radke | ...................... | F16J 15/20 428/378 |
| 6,471,213 B1 * | 10/2002 | Yuri | ..................... | F16J 15/3288 277/355 |

(Continued)

FOREIGN PATENT DOCUMENTS

| | | |
|---|---|---|
| JP | S59-186402 U | 12/1984 |
| JP | H02-38764 A | 2/1990 |

(Continued)

OTHER PUBLICATIONS

International Search Report dated Jun. 7, 2022, issued in counterpart International application No. PCT/JP2022/014898, with English translation. (11 pages).

(Continued)

*Primary Examiner* — Gilbert Y Lee
(74) *Attorney, Agent, or Firm* — WHDA, LLP

(57) ABSTRACT

A method for manufacturing a seal ring according to at least one embodiment is a method for manufacturing a circular seal ring, including: a step of forming a seal fin by turning an inner peripheral portion of a first member and a second member each having a semi-circular shape in a state where both end portions of each of the first member and the second member are in contact with each other; and a step of turning an outer peripheral portion of the first member and the second member in a state where the both end portions of each of the first member and the second member are spaced apart from each other.

11 Claims, 16 Drawing Sheets

(56) References Cited

U.S. PATENT DOCUMENTS

| | | | |
|---|---|---|---|
| 2012/0177484 | A1 | 7/2012 | Lusted et al. |
| 2018/0371927 | A1 | 12/2018 | Kuwamura et al. |

FOREIGN PATENT DOCUMENTS

| | | | |
|---|---|---|---|
| JP | 2012-145224 | A | 8/2012 |
| JP | 2013-142435 | A | 7/2013 |
| JP | 2013-194519 | A | 9/2013 |
| JP | 2017-106395 | A | 6/2017 |

OTHER PUBLICATIONS

Notification of Transmittal of Translation of the International Preliminary Report on Patentability (Form PCT/IB/338) issued in counterpart International application No. PCT/JP2022/014898 mailed Oct. 12, 2023 with Forms PCT/IB/373 and PCT/ISA/237, with English translation. (12 pages).

* cited by examiner

METHOD FOR MANUFACTURING SEAL RING, METHOD FOR ASSEMBLING TURBINE, AND TURBINE

TECHNICAL FIELD

The present disclosure relates to a method for manufacturing a seal ring, a method for assembling a turbine, and the turbine. This application claims the priority of Japanese Patent Application No. 2021-057965 filed on Mar. 30, 2021, the content of which is incorporated herein by reference.

BACKGROUND

As is well known, as a type of steam turbine, there is a steam turbine that includes a casing, a shaft (rotor) rotatably disposed inside the casing, a plurality of stator vanes fixedly disposed on an inner peripheral portion of the casing, and a plurality of rotor blades radially disposed on the shaft on a downstream side of the plurality of stator vanes. In such a steam turbine, steam (fluid) flows in the axial direction of the shaft in the casing, thereby applying a rotational force to the rotor blades and rotating the shaft.

Meanwhile, in this type of steam turbine, a radial gap is formed between a tip end portion of the rotor blade and an inner peripheral surface of the casing and the aforementioned steam also flows through this gap, but the steam (leaked steam) flowing through the gap does not apply the rotational force to the rotor blade. Therefore, in order to improve performance of the steam turbine, it is important to reduce the amount of the leaked steam passing through the gap.

Therefore, for example, as in Patent Document 1, a turbine is proposed which has a structure where a seal ring with a plurality of seal fins extending toward a tip end portion of a rotor blade is disposed in a casing and a minute gap is formed between the tip end portion of the rotor blade and a tip of each seal fin.

CITATION LIST

Patent Literature

Patent Document 1: JP2017-106395A

SUMMARY

Technical Problem

Generally, in a steam turbine, deformation in casing can occur due to an influence of gravity or heat. Therefore, if a size of the minute gap between the tip end portion of the rotor blade and the tip of each seal fin is decreased, the deformation in casing may cause the tip end portion of the rotor blade and the tip of each seal fin to contact each other. However, if the size of the minute gap between the tip end portion of the rotor blade and the tip of each seal fin is increased in order to prevent the contact between the tip end portion of the rotor blade and the tip of each seal fin, the amount of the leaked steam passing through this minute gap increases, resulting in deterioration in performance of the steam turbine.

Therefore, it is desirable that a shape of the tip of each seal fin as viewed from the axial direction of the casing is not a perfect circular shape extending in the circumferential direction of the casing, but a flattened shape with different diameters in the horizontal direction and the vertical direction.

In view of the above, an object of at least one embodiment of the present disclosure is to provide a seal ring capable of improving the performance of the turbine.

Solution to Problem (1) A method for manufacturing a seal ring according to at least one embodiment of the present disclosure is a method for manufacturing a circular seal ring, including: a step of forming a seal fin by turning an inner peripheral portion of a first member and a second member each having a semi-circular shape in a state where both end portions of each of the first member and the second member are in contact with each other; and a step of turning an outer peripheral portion of the first member and the second member in a state where the both end portions of each of the first member and the second member are spaced apart from each other.

(2) A method for assembling a turbine according to at least one embodiment of the present disclosure, includes: a step of mounting, on a blade ring upper half portion, the first member formed with the seal fin by the method for manufacturing the seal ring of the above configuration (1); and a step of mounting, on a blade ring lower half portion, the second member formed with the seal fin by the method for manufacturing the seal ring of the above configuration (1).

(3) A turbine according to at least one embodiment of the present disclosure, includes: a blade ring upper half portion; a blade ring lower half portion; and a circular seal ring. The seal ring includes: a first member attached to the blade ring upper half portion, having a semi-circular shape, and formed with a seal fin in an inner peripheral portion; and a second member attached to the blade ring lower half portion, having a semi-circular shape, and formed with the seal fin in the inner peripheral portion. The first member and the second member are attached to the blade ring upper half portion and the blade ring lower half portion in a state where both end portions of each of the first member and the second member are spaced apart from each other. A space between end portions on one side of the both end portions of each of the first member and the second member is the same as a space between end portions on another side.

Advantageous Effects

According to at least one embodiment of the present disclosure, it is possible to improve performance of a turbine.

DETAILED DESCRIPTION

Figure 1:
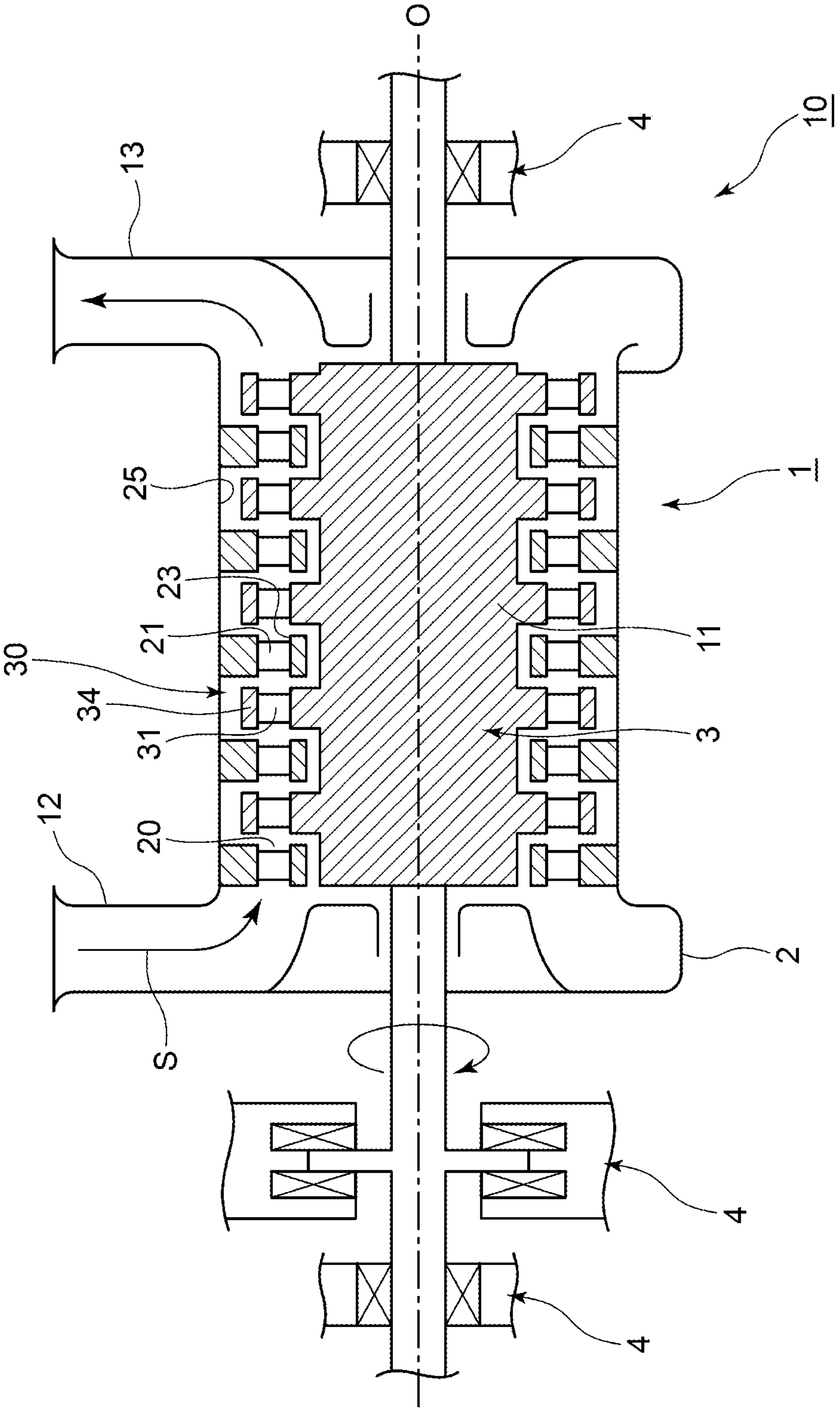
FIG. 1 is a view for describing a steam turbine as an example of a turbine.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as “in a direction”, “along a direction”, “parallel”, “orthogonal”, “centered”, “concentric” and “coaxial” shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as “same”, “equal”, and “uniform” shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions “comprising”, “including”, “having”, “containing”, and “constituting” one constituent component are not exclusive expressions that exclude the presence of other constituent components.

(As to Overview of Steam Turbine 1)

FIG. 1 is a view for describing a steam turbine as an example of a turbine which includes a seal ring manufactured by a method for manufacturing the seal ring according to some embodiments.

As shown in FIG. 1, a steam turbine plant 10 includes a steam turbine 1, a steam supply pipe 12 for supplying steam S as a working fluid from a steam supply source (not shown) to the steam turbine 1, and a steam discharge pipe 13 connected to a downstream side of the steam turbine 1 to discharge steam.

As shown in FIG. 1, the steam turbine 1 according to some embodiments includes a casing 2, a rotor body 11 for rotating around an axis O in the casing 2, a rotor 3 connected to the rotor body 11, and a bearing part 4 for rotatably supporting the rotor body 11 around the axis O.

The rotor 3 includes the rotor body 11 and a turbine rotor blade 30. The turbine rotor blade 30 includes a plurality of rotor blade bodies 31 attached so as to extend from the rotor body 11 in a radial direction, and a tip shroud 34 connected to a tip end portion of each of the plurality of rotor blade bodies 31.

The casing 2 is a nearly cylindrical member disposed so as to cover the rotor 3 from an outer peripheral side. The casing 2 is provided with a plurality of stator vane bodies 21 attached so as to extend radially inward toward the rotor body 11. The plurality of stator vane bodies 21 are arranged along the circumferential direction of an inner peripheral surface 25 and the axis O direction. The plurality of stator vane bodies 21 are attached with a hub shroud 23 continuing into a tip end portion each of the plurality of stator vane bodies 21.

Inside the casing 2, a region, where the stator vane bodies 21 and the rotor blade bodies 31 are arranged, forms a main passage 20 through which the steam S as the working fluid flows.

Figure 2:
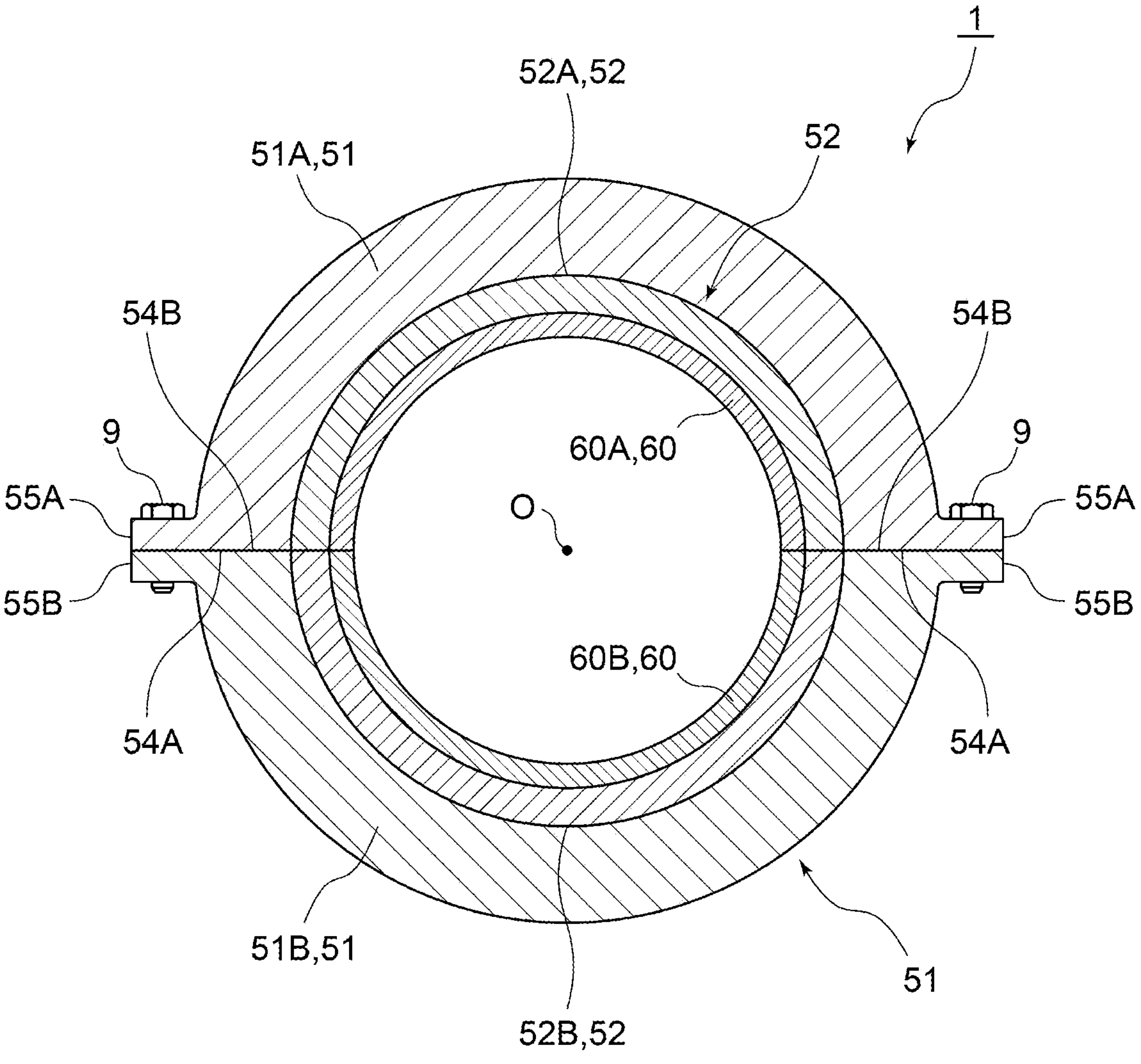
FIG. 2 is a schematic cross-sectional view of a casing body forming the steam turbine of FIG. 1, as viewed in a cross section orthogonal to an axis of a rotor.

FIG. 2 is a schematic cross-sectional view of a casing body forming the steam turbine of FIG. 1, as viewed in a cross section orthogonal to the axis of the rotor.

Figure 3:
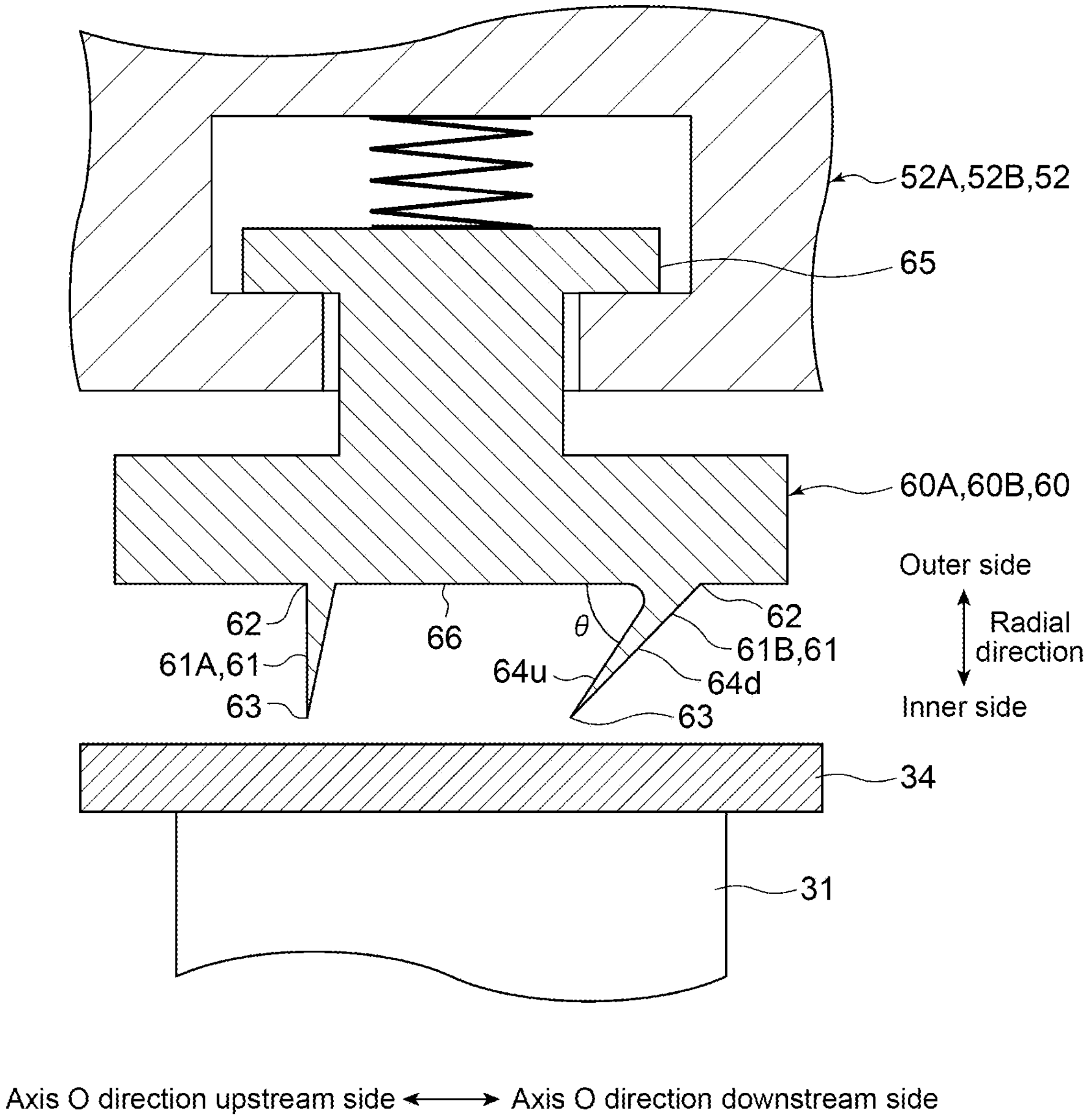
FIG. 3 is a view showing a cross section of a blade ring and a seal ring as viewed from the circumferential direction.

FIG. 3 is a view showing a cross section of a blade ring and a seal ring as viewed from the circumferential direction.

For descriptive convenience, in the following description, an upstream side of the steam turbine 1 along the axis O will be referred to as an upstream side in the axis O direction or simply an upstream side, and a downstream side of the steam turbine 1 along the axis O will be referred to as a downstream side in the axis O direction or simply referred to as a downstream side.

The casing 2 includes a casing body (casing) 51 defining a flow path of the steam S, and a ring-shaped blade ring 52 (see FIG. 2, 3) fixed to an inner peripheral portion of the casing body 51. Further, as shown in FIG. 3, a seal ring 60 is disposed in an inner peripheral portion of the blade ring 52.

As shown in FIG. 2, the casing body 51 is divided into two portions of a casing upper half portion 51A and a casing lower half portion 51B along a plane including the axis O of the rotor 3. The casing upper half portion 51A and the casing lower half portion 51B are respectively formed with flange portions 55A and 55B projecting in the radial direction of the rotor 3, on surfaces (division surfaces 54A and 54B) that abut against each other. The casing upper half portion 51A and the casing lower half portion 51B are fastened with bolts 9 in the flange portions 55A and 55B.

The schematic cross-sectional view shown in FIG. 2 shows a cross section of the casing body 51 at an axial position where the turbine rotor blade 30 (see FIG. 1) is disposed radially inward, and the casing body 51 at this cross-sectional position is formed into a cylindrical shape.

Also, as with the casing body 51, the blade ring 52 is also divided into two portions of a blade ring upper half portion 52A and a blade ring lower half portion 52B along the plane including the axis O of the rotor 3. The blade ring upper half portion 52A is fixed to the casing upper half portion 51A, and the blade ring lower half portion 52B is fixed to the casing lower half portion 51B. The blade ring upper half portion 52A and the blade ring lower half portion 52B are connected to form the blade ring 52, by fastening and fixing the casing upper half portion 51A and the casing lower half portion 51B.

As with the casing body 51 and the blade ring 52, the seal ring 60 according to the present embodiment is divided into two portions of a seal ring upper half portion 60A and a seal ring lower half portion 60B.

The seal ring 60 is provided with a plurality of (two in the illustrated example) seal fins 61 extending radially inward toward an outer peripheral surface of the tip shroud 34. The plurality of seal fins 61 are arranged at intervals in the axial direction. A minute gap is defined between the tip of each seal fin 61 in an extension direction and the outer peripheral surface of the tip shroud 34.

With this configuration, it is possible to reduce the leakage flow rate of the steam S passing through the gap between the seal ring 60 and the tip shroud 34.

In the seal ring 60 shown in FIG. 3, of the two seal fins 61, a first seal fin 61A on the upstream side in the axis O direction is a straight fin radially extending from a base portion 62 toward a tip portion 63 with respect to the radial direction orthogonal to the axis O.

In the seal ring 60 shown in FIG. 3, of the two seal fins 61, a second seal fin 61B on the downstream side in the axis O direction is a slant fin slanted to the upstream side in the axis O direction, that is, the upstream side in a flow direction of the leaked steam, from the base portion 62 toward the tip portion 63 with respect to the radial direction. The second seal fin 61B is formed such that an angle θ between one side surface 64*u* of both side surfaces 64*u*, 64*d* of the second seal fin 61B, that is, the side surface 64*u* on the upstream side in the axis O direction and an inner peripheral surface 66 where the second seal fin 61B is formed makes an acute angle as viewed from the circumferential direction of the seal ring 60.

The seal ring 60 shown in FIG. 3 is mounted on an inner peripheral portion of the blade ring 52 in an outer peripheral portion 65 of the seal ring 60.

Generally, in the steam turbine 1, deformation in the casing 2 can occur mainly in the vertical direction due to an influence of gravity or heat. Therefore, if a size of a minute gap between the tip of each seal fin 61 and the tip shroud 34 continuing into the tip end portion of the turbine rotor blade 30 is decreased, the deformation in the casing 2 may cause the tip shroud 34 and the tip (tip portion 63) of each seal fin 61 to contact each other. However, if the size of the minute gap between the tip shroud 34 and the tip of each seal fin 61 is increased in order to prevent the contact between the tip shroud 34 and the tip of each seal fin 61, the amount of leaked steam passing through this minute gap increases, resulting in deterioration in performance of the steam turbine 1.

Therefore, it is desirable that a shape of the tip of each seal fin 61 as viewed from the axis O direction is not a perfect circular shape extending in the circumferential direction of the casing 2, but a flattened shape with different diameters in the horizontal direction and the vertical direction.

(As to Method for Manufacturing Seal Ring 60)

Therefore, in the method for manufacturing the seal ring according to the present embodiment, the seal ring 60 is manufactured in the following manner such that the above-described flattened shape is obtained.

Figure 4:
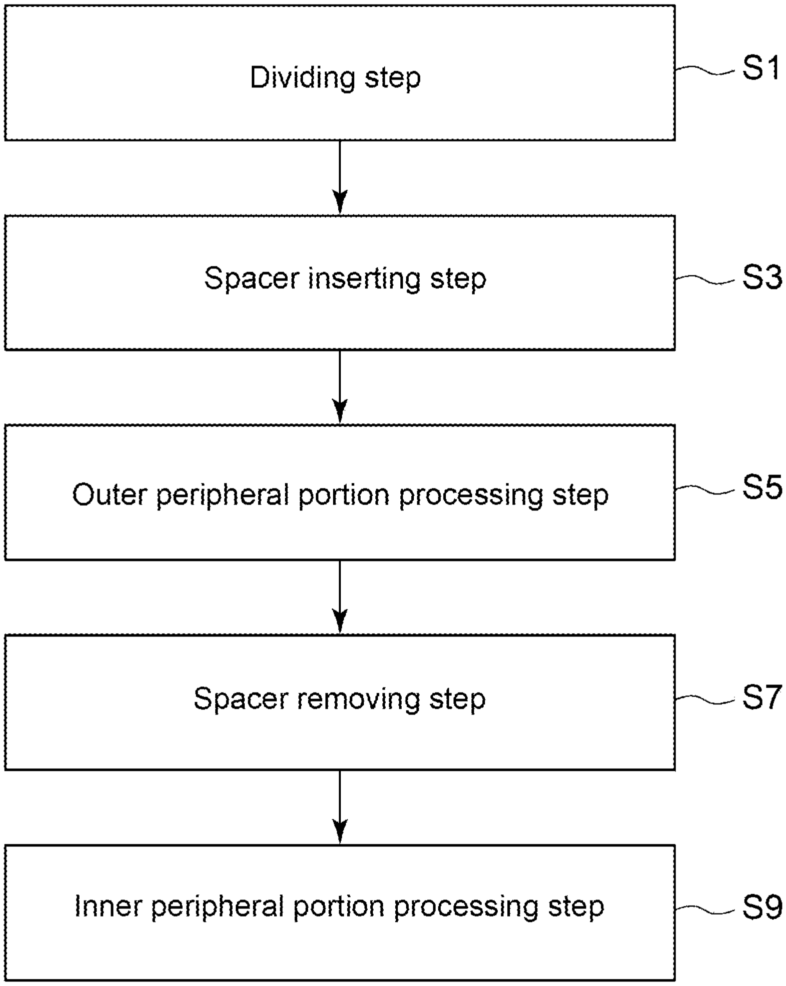
FIG. 4 is a flowchart showing a processing procedure in a method for manufacturing the seal ring according to the present embodiment.

FIG. 4 is a flowchart showing a processing procedure in the method for manufacturing the seal ring according to the present embodiment. The method for manufacturing the seal ring according to the present embodiment includes a dividing step S1, a spacer inserting step S3, an outer peripheral portion processing step S5, a spacer removing step S7, and an inner peripheral portion processing step S9.

(Dividing Step S1)

In the method for manufacturing the seal ring according to the present embodiment, the dividing step S1 is a step of dividing a member (circular member) 70 which is a material of the seal ring 60 and has a circular shape into a first member 71 and a second member 72 each having a semi-circular shape.

Figure 5A:
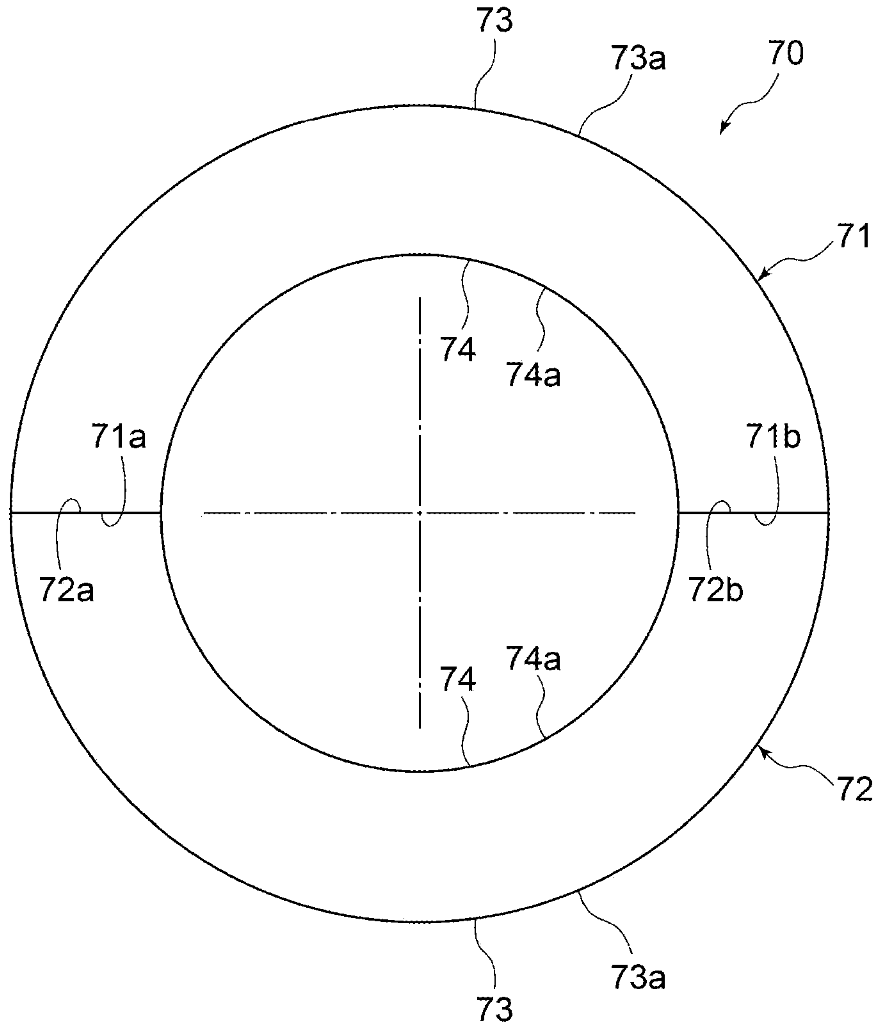
FIG. 5A is a view schematically showing a first member and a second member having been divided in a dividing step.

FIG. 5A is a view schematically showing the first member 71 and the second member 72 having been divided in the dividing step S1. In FIG. 5A and FIGS. 5B to 5F described later, the inner/outer diameter ratio of the seal ring 60, the size of a spacer 75 described later, or the like is different from that of the actual seal ring 60 such that a flattened state of the seal ring 60 is emphasized. Further, in FIGS. 5C and 5E, the shapes of the first member 71 and the second member 72 before turning are indicated by dashed lines.

In the method for manufacturing the seal ring according to the present embodiment, the circular member 70 is a member pre-processed so as to have a perfect circular shape in which an inner peripheral surface 74*a* and an outer peripheral surface 73*a* of the circular member 70 are concentric as viewed from a central axis direction of the circular ring, for example, that is, a member having a cylindrical shape. The dividing step S1 of the present embodiment includes equally dividing the circular member 70 to obtain the first member 71 and the second member 72 each having the semi-circular shape.

The first member 71 of the present embodiment has both end portions 71*a*, 71*b* which are circumferential end portions of the semi-circular shape, an outer peripheral portion 73 of the semi-circular shape on the radially outer side, and an inner peripheral portion 74 of the semi-circular shape on the radially inner side. The second member 72 of the present embodiment has both end portions 72*a*, 72*b* which are circumferential end portions of the semi-circular shape, the outer peripheral portion 73 of the semi-circular shape on the radially outer side, and the inner peripheral portion 74 of the semi-circular shape on the radially inner side.

The first member 71 of the present embodiment becomes the seal ring upper half portion 60A through the subsequent steps, and the second member 72 of the present embodiment becomes the seal ring lower half portion 60B through the subsequent steps.

(Spacer Inserting Step S3)

In the method for manufacturing the seal ring according to the present embodiment, the spacer inserting step S3 is a step of inserting the spacer 75 between end portions 71*a*, 72*a* on one side of the both end portions 71*a*, 71*b*, 72*a*, 72*b* of the first member 71 and the second member 72 and between end portions 71*b*, 72*b* on another side.

Figure 5B:
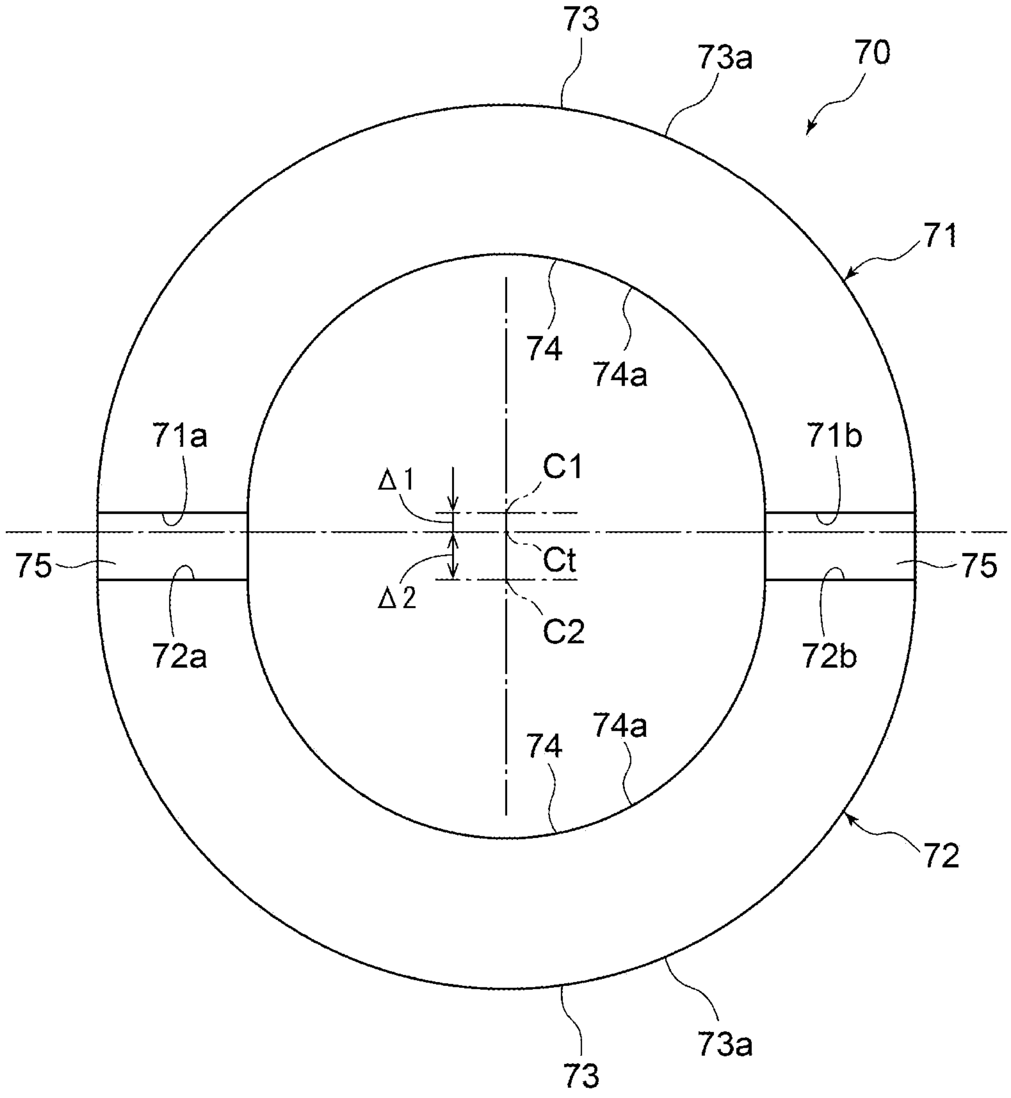
FIG. 5B is a view schematically showing the first member and the second member with a spacer being inserted therebetween.

FIG. 5B is a view schematically showing the first member 71 and the second member 72 with the spacer 75 being inserted therebetween.

The outer peripheral portion processing step S5 to be performed later includes turning the outer peripheral portion 73 of the first member 71 and the second member 72 by rotating the first member 71 and the second member 72 with the spacer 75 being inserted therebetween in a horizontal plane and cutting the first member 71 and the second member 72 with a cutting tool. Therefore, it is necessary to fix the first member 71 and the second member 72 with the spacer 75 being inserted therebetween, onto a table (not shown) for rotating the first member 71 and the second member 72 in the horizontal plane.

The spacer inserting step S3 of the present embodiment includes fixing to the above-described table the first member 71 and the second member 72 with the spacer 75 being inserted therebetween, after a center of curvature C1 of the first member 71 and a center of curvature C2 of the second member 72 are disposed on the above-described table to be offset from a turning center Ct during the turning to a radially outer side around the turning center Ct.

In the following description, the center of curvature C1 of the first member 71 refers to the center of curvature of the first member 71 (the center of curvatures of the inner peripheral surface 74*a* and the outer peripheral surface 73*a*) before the outer peripheral portion processing step S5 and the inner peripheral portion processing step S9 described later are performed.

That is, the center of curvature C1 of the first member 71 after the outer peripheral portion processing step S5 and the inner peripheral portion processing step S9 described later are performed is assumed to refer to a position corresponding to the center of curvatures of the inner peripheral surface 74*a* and the outer peripheral surface 73*a* if the outer peripheral portion processing step S5 and the inner peripheral portion processing step S9 described later are not performed.

More specifically, the spacer inserting step S3 of the present embodiment includes fixing to the above-described table the first member 71 and the second member 72 with the spacer 75 inserted therebetween, in a state where the center of curvature C1 of the first member 71 is offset radially outward from the above-described turning center Ct by a first offset amount Δ1 and in a state where the center of curvature C2 of the second member 72 is offset radially outward from the above-described turning center Ct by a second offset amount Δ2.

The first offset amount Δ1 corresponds to an offset amount by which the center of curvature of the seal fin 61 of the seal ring upper half portion 60A is offset vertically upward with respect to the axis O of the rotor 3 in the steam turbine 1. The second offset amount Δ2 corresponds to an offset amount by which the center of curvature of the seal fin 61 of the seal ring lower half portion 60B is offset vertically downward with respect to the axis O of the rotor 3 in the steam turbine 1.

The first offset amount Δ1 and the second offset amount Δ2 may be the same offset amount or may be different offset amounts.

(Outer Peripheral Portion Processing Step S5)

In the method for manufacturing the seal ring according to the present embodiment, the outer peripheral portion processing step S5 is a step of turning the outer peripheral portion 73 of the first member 71 and the second member 72 in a state where the both end portions 71*a*, 71*b*, 72*a*, 72*b* of the first member 71 and the second member 72 are spaced apart from each other.

The outer peripheral portion processing step S5 of the present embodiment includes fixing, onto the table (not shown) for rotating the first member 71 and the second member 72 in the horizontal plane, the first member 71 and the second member 72 in the state where the both end portions 71*a*, 71*b*, 72*a*, 72*b* are spaced apart from each other. Then, the outer peripheral portion 73 of the first member 71 and the second member 72 is turned by rotating the first member 71 and the second member 72 in the horizontal plane and cutting the first member 71 and the second member 72 with the cutting tool.

Figure 5C:
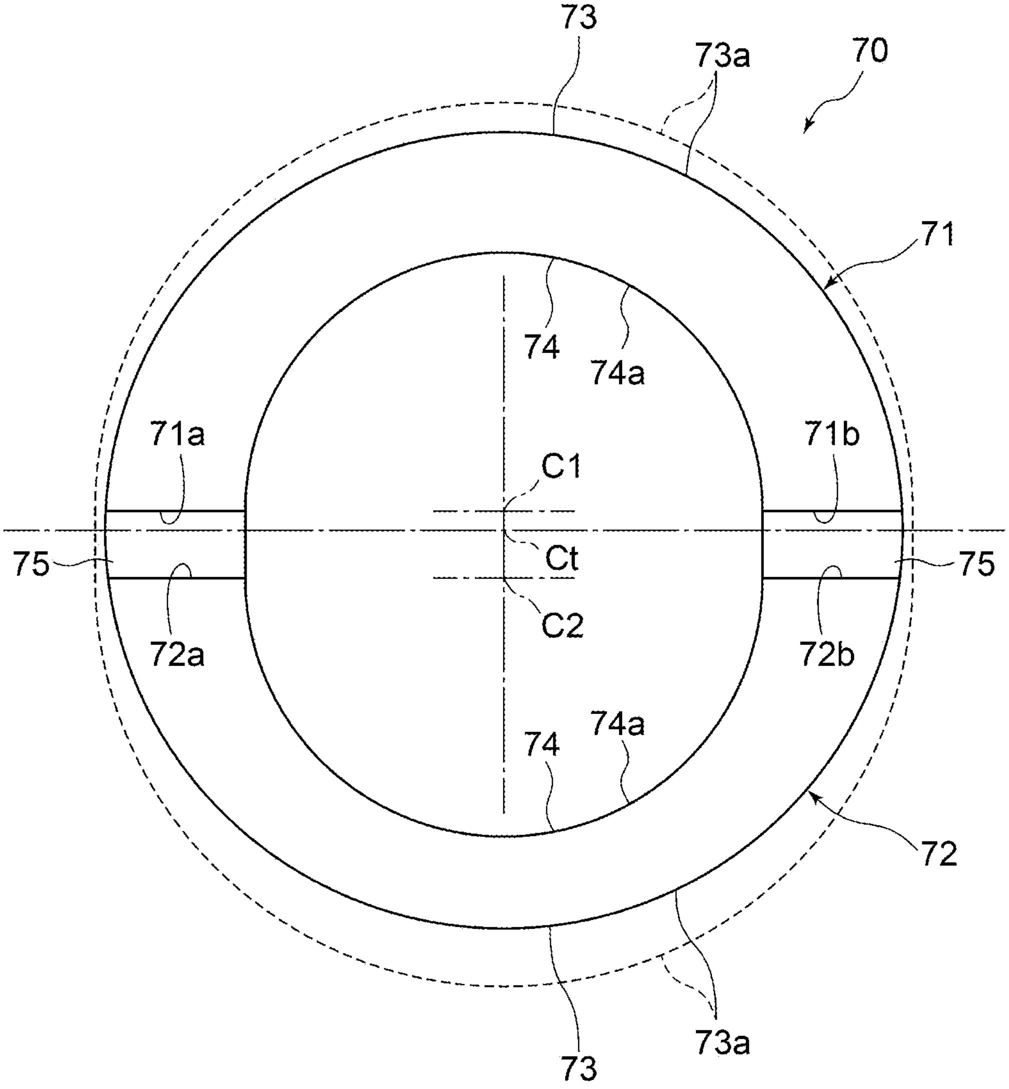
FIG. 5C is a view schematically showing the first member and the second member having undergone an outer peripheral portion processing step.

FIG. 5C is a view schematically showing the first member 71 and the second member 72 having undergone the outer peripheral portion processing step S5. The dashed line in FIG. 5C indicates the shape of the outer peripheral portion 73 (outer peripheral surface 73*a*) before the outer peripheral portion processing step S5 is performed.

As described above, the outer peripheral portion processing step S5 of the present embodiment includes turning the outer peripheral portion 73 of the first member 71 and the second member 72 which respectively have the center of curvature C1 and the center of curvature C2 disposed to be offset from the turning center Ct during the turning to the radially outer side around the turning center Ct.

Whereby, the outer peripheral portion 73 of the first member 71 and the second member 72 can be processed to have the perfect circular shape in the state where the center of curvature C1 of the first member 71 and the center of curvature C2 of the second member 72 are offset as described above.

More specifically, as described above, the outer peripheral portion processing step S5 of the present embodiment includes turning the outer peripheral portion 73 of the first member 71 which has the center of curvature C1 disposed to be offset from the above-described turning center Ct to the radially outer side by the first offset amount Δ1 and the second member 72 which has the center of curvature C2 disposed to be offset from the above-described turning center Ct to the radially outer side by the second offset amount Δ2.

Whereby, the outer peripheral portion 73 of the first member 71 and the second member 72 can be processed to have the perfect circular shape in the state where the center of curvature C1 of the first member 71 and the center of curvature C2 of the second member 72 are offset from the above-described turning center Ct to the radially outer side by the first offset amount Δ1 and the second offset amount Δ2 as described above.

The outer peripheral portion processing step S5 of the present embodiment preferably includes turning the outer peripheral portion 73 of the first member 71 and the second member 72 disposed such that a space between the end portions 71*a*, 72*a* on the one side of the both end portions 71*a*, 71*b*, 72*a*, 72*b* of the first member 71 and the second member 72 is the same as a space between the end portions 71*b*, 72*b* on the another side.

Whereby, the outer peripheral portion 73 of the first member 71 and the second member 72 can be processed to have the perfect circular shape in the state where the first member 71 and the second member 72 are disposed as described above.

Further, the outer peripheral portion processing step S5 of the present embodiment preferably includes turning the outer peripheral portion 73 of the first member 71 and the second member 72 in the state where the spacer 75 is disposed between the end portions 71*a*, 72*a* on the one side of the both end portions 71*a*, 71*b*, 72*a*, 72*b* of the first member 71 and the second member 72 and between the end portions 71*b*, 72*b* on the another side.

Whereby, the size of the space between the both end portions 71*a*, 71*b*, 72*a*, 72*b* of the first member 71 and the second member 72 can be set by the spacer 75, making it easy to set the size of the space.

By performing the outer peripheral portion processing step S5 of the present embodiment, the outer peripheral portion 73 of the first member 71 and the second member 72 has the perfect circular shape as viewed from the central axis direction of the circular ring, in the state where the both end portions 71*a*, 71*b*, 72*a*, 72*b* of the first member 71 and the second member 72 are spaced apart from each other. More specifically, the outer peripheral portion 73 of the first member 71 and the second member 72 has the perfect circular shape as viewed from the central axis direction of the circular ring, in an arrangement state where the space between the end portions 71*a*, 72*a* on the one side and the space between the end portions 71*b*, 72*b* on the another side are equal to a sum ($\Delta 1+\Delta 2$) of the first offset amount $\Delta 1$ and the second offset amount $\Delta 2$.

(Spacer Removing Step S7)

In the method for manufacturing the seal ring according to the present embodiment, the spacer removing step S7 is a step of removing the spacers 75 and bringing the both end portions 71*a*, 71*b*, 72*a*, 72*b* of the first member 71 and the second member 72 into contact with each other, after the outer peripheral portion processing step S5.

Figure 5D:
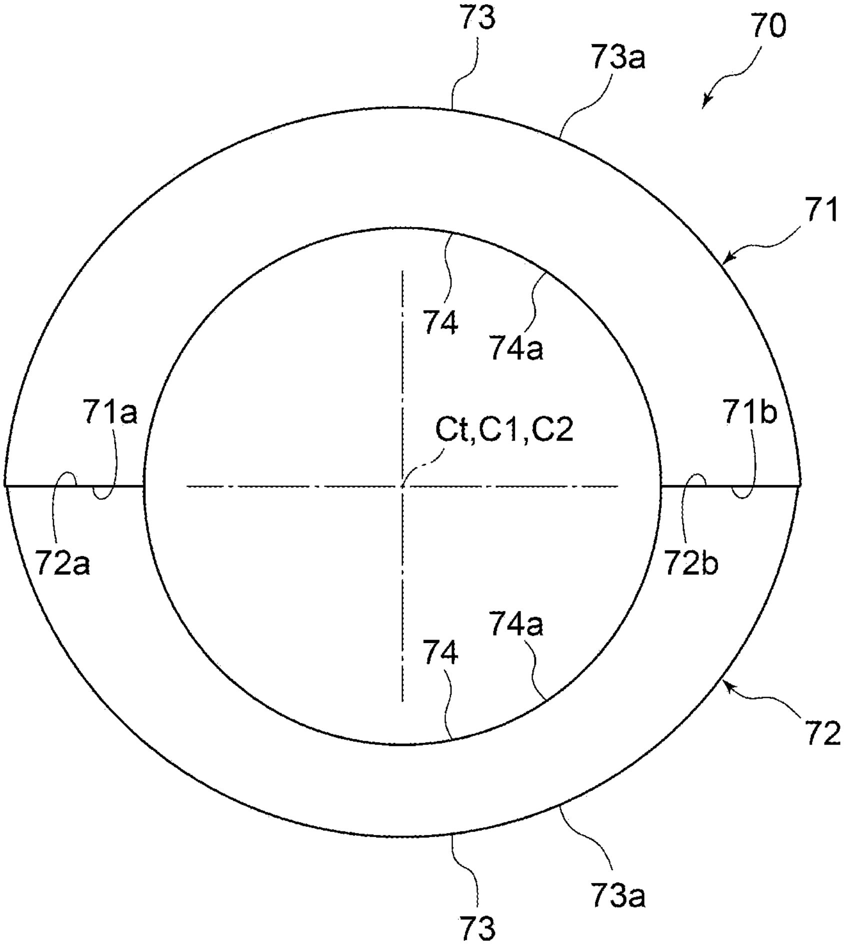
FIG. 5D is a view schematically showing a state where the spacer is removed and both end portions of each of the first member and the second member are in contact with each other.

FIG. 5D is a view schematically showing a state where the spacer 75 is removed and the both end portions 71*a*, 71*b*, 72*a*, 72*b* of the first member 71 and the second member 72 are in contact with each other.

In the spacer removing step S7 of the present embodiment, in the state where the spacer 75 is removed, the end portions 71*a*, 72*a* on the one side and the end portions 71*b*, 72*b* on the another side are brought into contact with each other, and the both end portions 71*a*, 71*b*, 72*a*, 72*b* are free of radial misalignment, a position of the center of curvature C1 of the first member 71 (the center of curvature of the inner peripheral surface 74*a* of the inner peripheral portion 74 of the first member 71) coincides with a position of the center of curvature C2 of the second member 72 (the center of curvature of the inner peripheral surface 74*a* of the inner peripheral portion 74 of the second member 72).

The spacer removing step S7 of the present embodiment includes fixing, onto the table (not shown) for rotating the first member 71 and the second member 72 in the horizontal plane, the first member 71 and the second member 72 in a state where the position of the center of curvature C1 of the first member 71 (the position of the center of curvature C2 of the second member 72) coincides with the turning center Ct during the turning.

(Inner Peripheral Portion Processing Step S9)

In the method for manufacturing the seal ring according to the present embodiment, the inner peripheral portion processing step S9 is a step of forming the seal fin 61 by turning the inner peripheral portion 74 of the first member 71 and the second member 72 in the state where the both end portions 71*a*, 71*b*, 72*a*, 72*b* of the first member 71 and the second member 72 are in contact with each other.

Figure 5E:
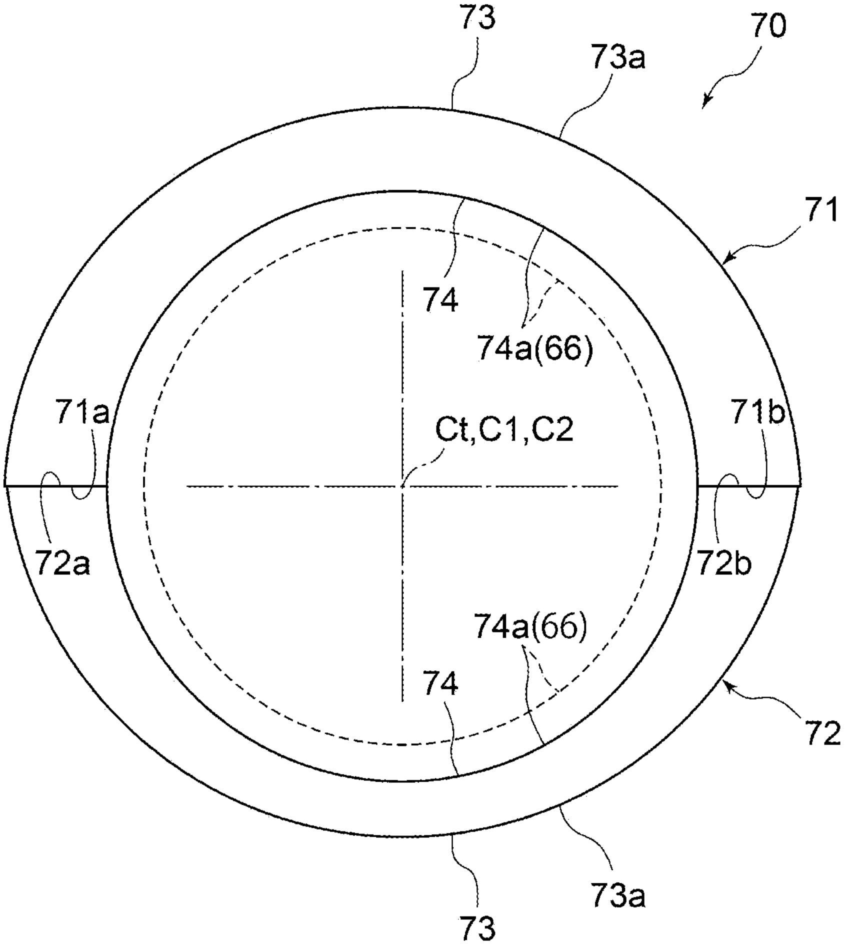
FIG. 5E is a view schematically showing the first member and the second member having undergone an inner peripheral portion processing step.

FIG. 5E is a view schematically showing the first member 71 and the second member 72 having undergone the inner peripheral portion processing step S9. The dashed line in FIG. 5E indicates the shape of the inner peripheral portion 74 (inner peripheral surface 74*a*) before the inner peripheral portion processing step S9 is performed.

The inner peripheral portion processing step S9 of the present embodiment includes forming the seal fin 61 such that the shape of the seal fin 61 is the perfect circular shape as viewed from the central axis direction of the circular ring, in the state where the both end portions 71*a*, 71*b*, 72*a*, 72*b* are in contact with each other.

The inner peripheral portion processing step S9 of the present embodiment includes forming the first seal fin 61A by being cut with a general-purpose cutting tool, for example. The inner peripheral portion processing step S9 of the present embodiment includes forming, of the both side surfaces 64*u*, 64*d* of the second seal fin 61B, the side surface 64*d* facing the downstream side in the axis O direction when attached to the casing body 51, by being cut with the general-purpose cutting tool, for example. The inner peripheral portion processing step S9 of the present embodiment includes forming, of the both side surfaces both side surfaces 64*u*, 64*d* of the second seal fin 61B, the side surface 64*u* facing the upstream side in the axis O direction when attached to the casing body 51 and the inner peripheral surface 74*a* connected to the side surface 64*u*, by being cut with a dedicated cutting tool formed in accordance with the shapes of the side surface 64*u* and the inner peripheral surface 74*a* (inner peripheral surface 66) connected to the side surface 64*u*.

In the method for manufacturing the seal ring according to the present embodiment, the seal ring 60, that is, the seal ring upper half portion 60A and the seal ring lower half portion 60B can be manufactured by performing the outer peripheral portion processing step S5 and the inner peripheral portion processing step S9 described above.

The tip portion 63 of the seal fin 61 in the seal ring upper half portion 60A and the tip portion 63 of the seal fin 61 in the seal ring lower half portion 60B, which are manufactured by the method for manufacturing the seal ring according to the present embodiment, have an arc shape of a perfect circle.

In the method for manufacturing the seal ring according to the present embodiment, the dividing step S1, the spacer inserting step S3, the outer peripheral portion processing step S5, the spacer removing step S7, and the inner peripheral portion processing step S9 may sequentially be performed as described above, but the inner peripheral portion processing step S9 may be performed before the outer peripheral portion processing step S5 is performed.

As described above, if the dividing step S1, the spacer inserting step S3, the outer peripheral portion processing step S5, the spacer removing step S7, and the inner peripheral portion processing step S9 are sequentially performed, the spacer inserting step S3 is performed prior to the outer peripheral portion processing step S5 and the spacer removing step S7 is performed after the outer peripheral portion processing step S5. Then, the inner peripheral portion processing step S9 is performed after the spacer removing step S7.

In this manner, the outer peripheral portion 73 may be turned prior to the formation of the seal fin 61.

Further, if the inner peripheral portion processing step S9 is performed before the outer peripheral portion processing step S5 is performed, the inner peripheral portion processing step S9 is performed after the dividing step S1 is performed. Then, the spacer inserting step S3 is performed after the inner peripheral portion processing step S9. The outer peripheral portion processing step S5 is performed after the spacer inserting step S3. After the outer peripheral portion processing step S5 is performed, the spacer 75 is removed in the spacer removing step S7 to complete the seal ring upper half portion 60A and the seal ring lower half portion 60B.

In this manner, the outer peripheral portion 73 may be turned after the seal fin 61 is formed.

Figure 5F:
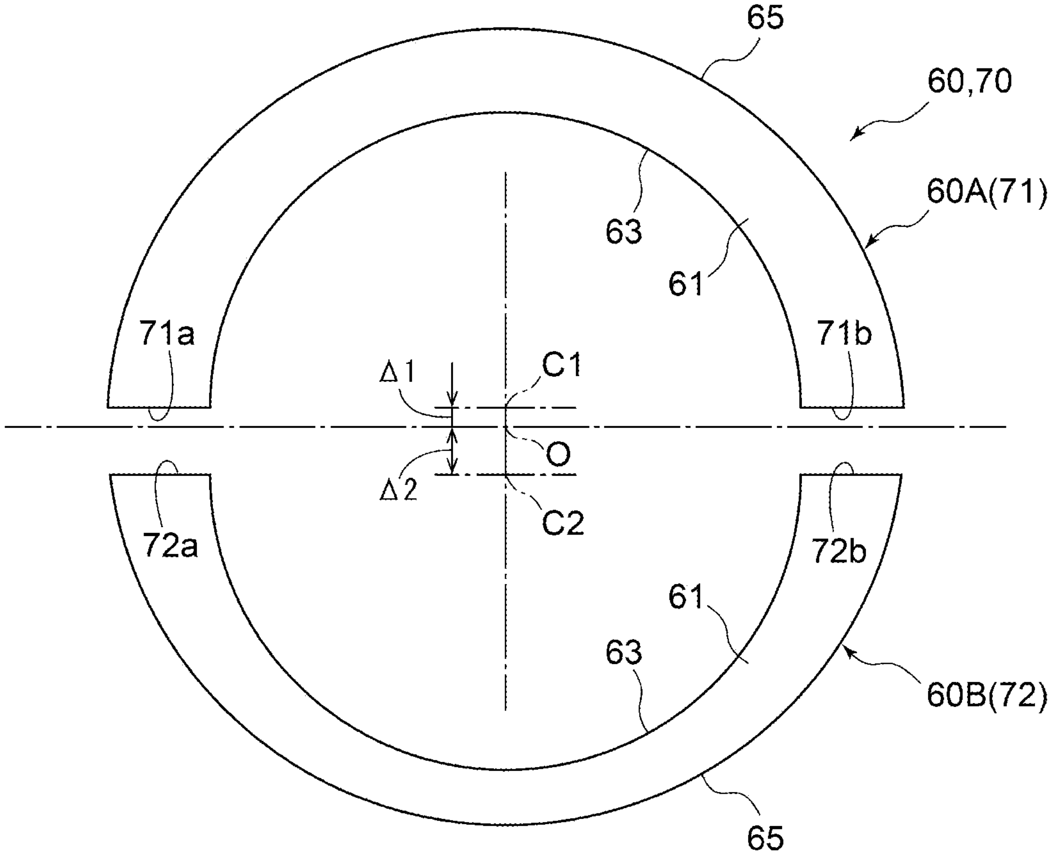
FIG. 5F is a view schematically showing the first member and the second member having undergone the inner peripheral portion processing step.

FIG. 5F is a view schematically showing the first member 71 and the second member 72, that is, the seal ring upper half portion 60A and the seal ring lower half portion 60B having undergone the inner peripheral portion processing step S9, and shows a state where the seal ring upper half portion 60A and the seal ring lower half portion 60B are attached to the casing body 51.

In the steam turbine 1 according to the present embodiment, the seal ring upper half portion 60A is attached to the casing body 51 in a state where the center of curvature C1 of the first member 71 is offset upward relative to the axis O by the first offset amount Δ1, that is, in a state where the both end portions 71*a*, 71*b* are offset upward relative to the horizontal plane including the axis O by the first offset amount Δ1.

In the steam turbine 1 according to the present embodiment, the seal ring lower half portion 60B is attached to the casing body 51 in a state where the center of curvature C2 of the second member 72 is offset downward relative to the axis O by the second offset amount Δ2, that is, in a state where the both end portions 72*a*, 72*b* are offset downward relative to the horizontal plane including the axis O by the second offset amount Δ2.

As described above, in the state where the both end portions 71*a*, 71*b*, 72*a*, 72*b* are in contact with each other, the shape of the seal fin 61 is the perfect circular shape as viewed from the central axis direction of the circular ring. Thus, in the state where the seal ring upper half portion 60A and the seal ring lower half portion 60B are attached to the casing body 51, the center of curvature of the tip portion 63 of the seal fin 61 in the seal ring upper half portion 60A deviates from the axis O vertically upward by the first offset amount Δ1 and the center of curvature of the tip portion 63 of the seal fin 61 in the seal ring lower half portion 60B deviates from the axis O vertically downward by the second offset amount Δ2. Therefore, in the state where the seal ring upper half portion 60A and the seal ring lower half portion 60B are attached to the casing body 51, the tip portion 63 of the seal fin 61 in the seal ring upper half portion 60A and the tip portion 63 of the seal fin 61 in the seal ring lower half portion 60B are separated in the vertical direction by the total value (Δ1+Δ2) of the first offset amount Δ1 and the second offset amount Δ2. Therefore, in the state where the seal ring upper half portion 60A and the seal ring lower half portion 60B are attached to the casing body 51, the tip portion 63 of the seal fin 61 has a long diameter extending in the vertical direction and a short diameter extending in the horizontal direction as viewed from the axis O direction.

Thus, in the state where the seal ring upper half portion 60A and the seal ring lower half portion 60B are attached to the casing body 51, the tip portion 63 of the seal fin 61 has a flattened shape in which the vertical diameter is larger than the horizontal diameter by the total value (Δ1+Δ2) of the first offset amount Δ1 and the second offset amount Δ2.

That is, with the method for manufacturing the seal ring according to the present embodiment, the first member 71 and the second member 72 are obtained in which the inner peripheral portion 74 of the first member 71 and the second member 72 has the flattened shape in the state where the first member 71 and the second member 72 are attached to the casing 2.

Therefore, by applying the seal ring 60 manufactured by the method for manufacturing the seal ring according to the present embodiment to the steam turbine 1, the contact between the tip shroud 34 and the tip portion 63 of each seal fin 61, which is caused by the deformation in the casing 2 that can occur mainly in the vertical direction, can be suppressed while suppressing the amount of the leaked steam passing through the minute gap between the tip shroud 34 and the tip portion 63 of each seal fin 61.

In the state where the seal ring upper half portion 60A and the seal ring lower half portion 60B are attached to the casing body 51, a gap is formed between the end portions 71*a*, 72*a* on the one side of the both end portions 71*a*, 71*b*, 72*a*, 72*b*, and between the end portions 71*b*, 72*b* on the another side. However, in the actual steam turbine 1, the size of this gap is narrow enough for the amount of the leaked steam leaking from this gap to be ignorable.

(Advantages Over Conventional Method for Manufacturing Seal Ring)

Hereinafter, advantages of the method for manufacturing the seal ring according to the present embodiment over a conventional method for manufacturing a seal ring will be described.

Figure 8A:
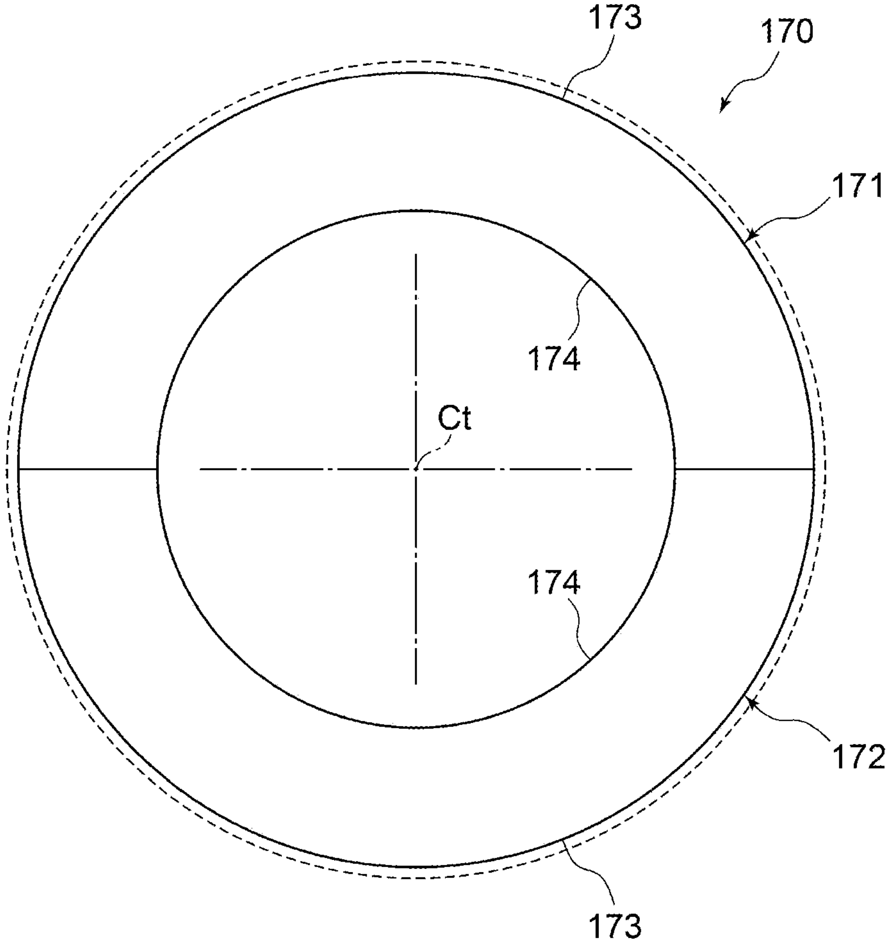
FIG. 8A is a schematic view for describing a conventional method for manufacturing a seal ring having a slant fin.
Figure 8B:
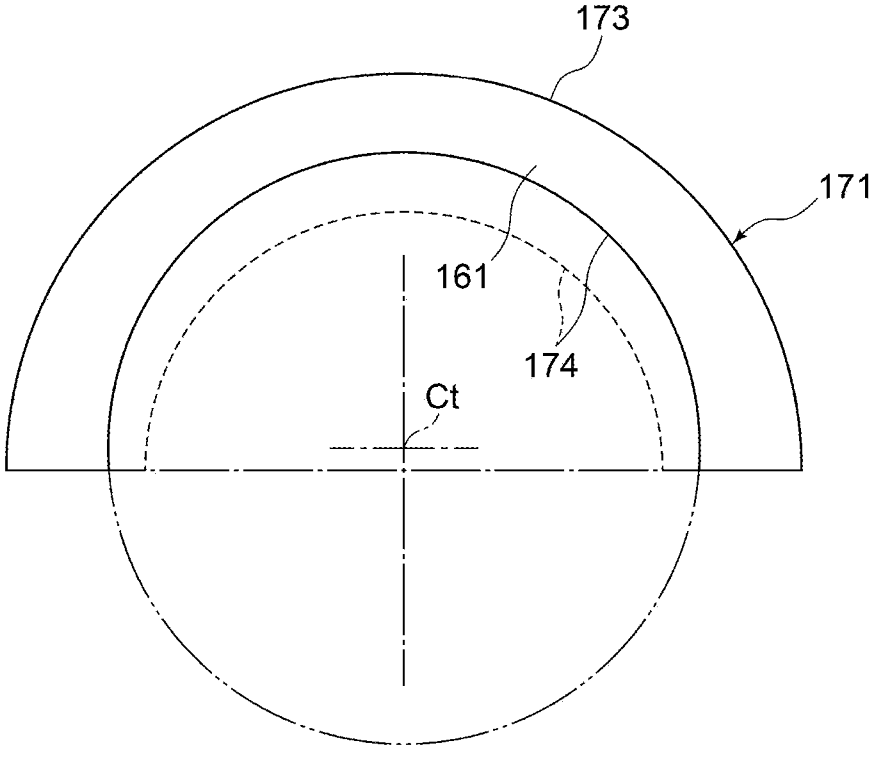
FIG. 8B is a schematic view for describing the conventional method for manufacturing the seal ring having the slant fin.
Figure 8C:
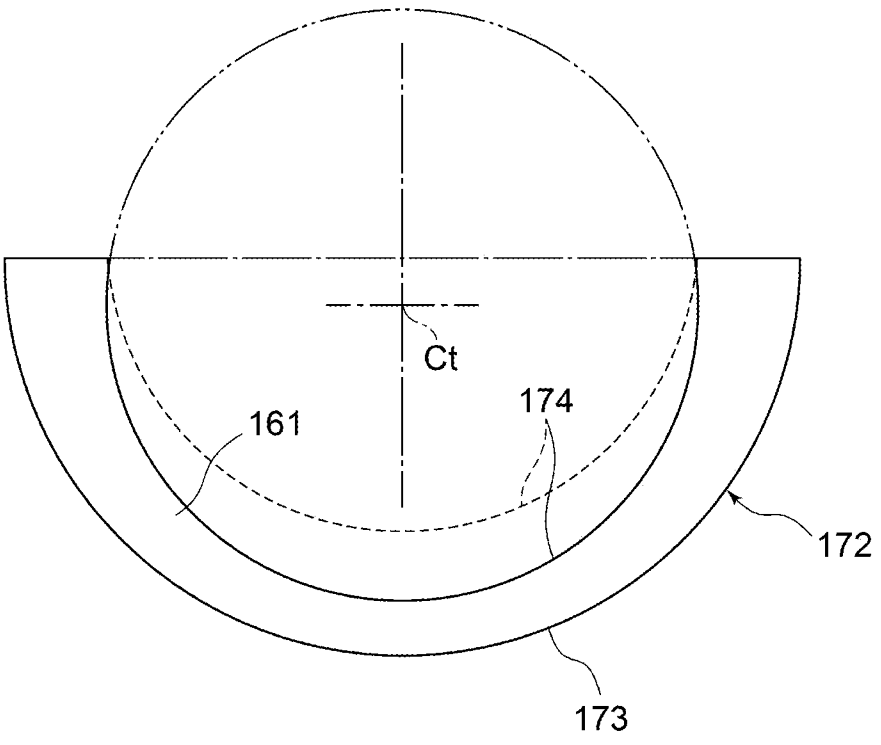
FIG. 8C is a schematic view for describing the conventional method for manufacturing the seal ring having the slant fin.

FIGS. 8A to 8D are each a schematic view for describing the conventional method for manufacturing the seal ring having a slant fin. In FIGS. 8A to 8C, the shapes of a first member 171 and a second member 172 before turning are indicated by dashed lines. Further, in FIGS. 8B and 8C, a movement locus of a tip of a cutting tool as viewed from the first member 171 and the second member 172 is indicated by a double-dotted chain line.

In the conventional method for manufacturing the seal ring, in manufacturing a seal ring 160 having the slant fin, a circular member 170 as a material is divided into the first member 171 and the second member 172 each having a semi-circular shape, as in the method for manufacturing the seal ring according to the present embodiment. Then, as shown in FIG. 8A, an outer peripheral portion 173 of the circular member 170 is turned in a state where division surfaces of the first member 171 and the second member 172 are in contact with each other.

Thereafter, as shown in FIG. 8B, only the first member 171 is disposed on the above-described table (not shown) to be offset toward the first member 171 side, from the turning center Ct during the turning to the radially outer side around the turning center Ct. The offset amount at this time is an offset amount corresponding to the above-described first offset amount 41. Then, a seal fin 161 in the first member 171 is formed by turning an inner peripheral portion 174 of the circular member 170.

Thereafter, as shown in FIG. 8C, only the second member 172 is disposed on the above-described table (not shown) to be offset toward the second member 172 side, from the turning center Ct during the turning to the radially outer side around the turning center Ct. The offset amount at this time is an offset amount corresponding to the above-described second offset amount Δ2. Then, the seal fin 161 in the second member 172 is formed by turning the inner peripheral portion 174 of the circular member 170.

Figure 8D:
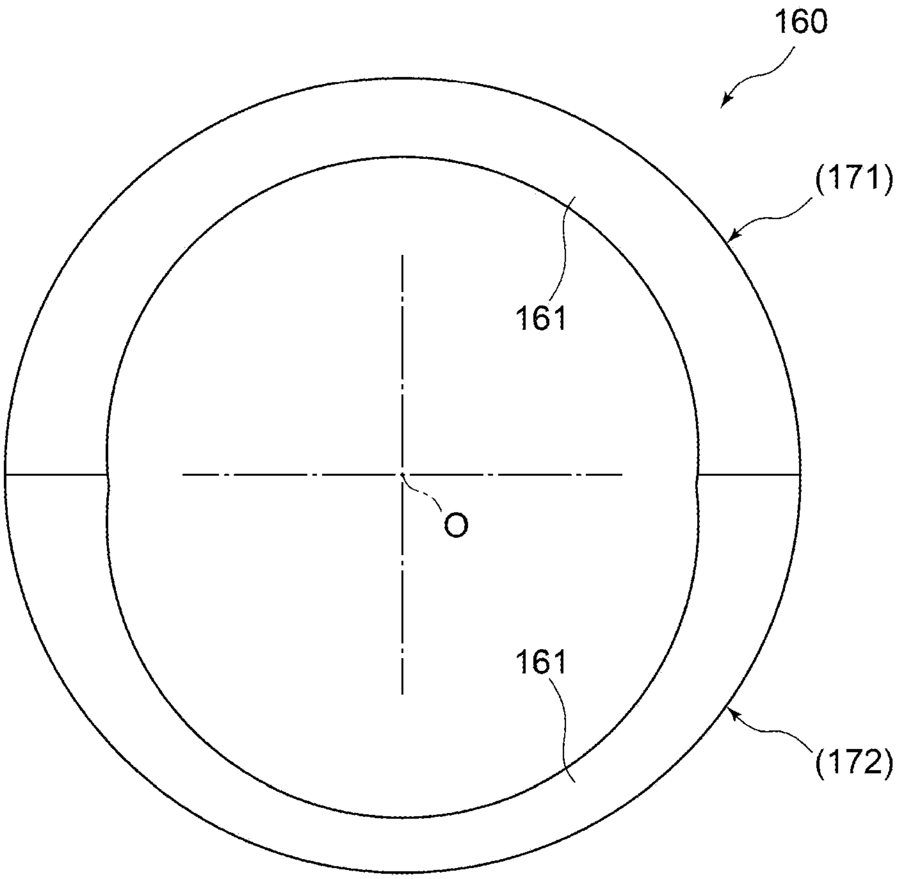
FIG. 8D is a schematic view for describing the conventional method for manufacturing the seal ring having the slant fin.

FIG. 8D is a schematic view showing the completed seal ring 160.

The reason why only one of the first member 171 or the second member 172 is turned and the other is not turned in FIGS. 8B and 8C is as follows.

That is, for example, in FIG. 8B, if the second member 172 remains disposed on the table (not shown) in the state where the division surfaces of the first member 171 and the second member 172 are in contact with each other, a radial position of the cutting tool moves radially inward with respect to the second member 172 by up to an amount corresponding to the offset amount of the first member 171 when the cutting tool passes through the inner peripheral portion 174 of the second member 172. Consequently, a region of the second member 172 that should be left for forming the slant fin is cut, making it impossible to form the slant fin in a desired shape in the second member 172.

Likewise, for example, in FIG. 8C, if the first member 171 remains disposed on the table (not shown) in the state where the division surfaces of the first member 171 and the second member 172 are in contact with each other, the radial position of the cutting tool moves radially inward with respect to the first member 171 by up to an amount corresponding to the offset amount of the second member 172 when the cutting tool passes through the inner peripheral portion 174 of the first member 171. Consequently, the slant fin that has been formed in the first member 171 is cut.

Thus, in the conventional method for manufacturing the seal ring, in manufacturing the seal ring 160 having the slant fin, the step of turning the inner peripheral portion 174 has two steps and a setup for changing workpieces on the table (not shown) from the first member 171 to the second member 172 is required, complicating the process.

By contrast, in the method for manufacturing the seal ring according to the present embodiment, when the inner peripheral portion 74 of the first member 71 and the second member 72 is turned (inner peripheral portion processing step S9), since the inner peripheral portion 74 is turned in the state where the both end portions 71*a*, 71*b*, 72*a*, 72*b* of the first member 71 and the second member 72 are in contact with each other, the inner peripheral portion 74 (thrust fin) of the first member 71 and the second member 72 has the perfectly circular shape in the state where the both end portions 71*a*, 71*b*, 72*a*, 72*b* of the first member 71 and the second member 72 are in contact with each other. Consequently, when the inner peripheral portion 74 is processed, relative positions of the cutting tool and the first member 71 and the second member 72 change in the radial direction just by the feed of the cutting tool required for processing, and thus the formed thrust fin (second seal fin 61B) does not unnecessarily interfere with the cutting tool.

Therefore, in the method for manufacturing the seal ring according to the present embodiment, the setup for changing the workpieces on the table (not shown) becomes unnecessary, making it possible to simplify the process.

(Method for Assembling Turbine)

Hereinafter, a method for assembling the steam turbine 1 including the seal ring 60 manufactured as described above will be described.

Figure 6:
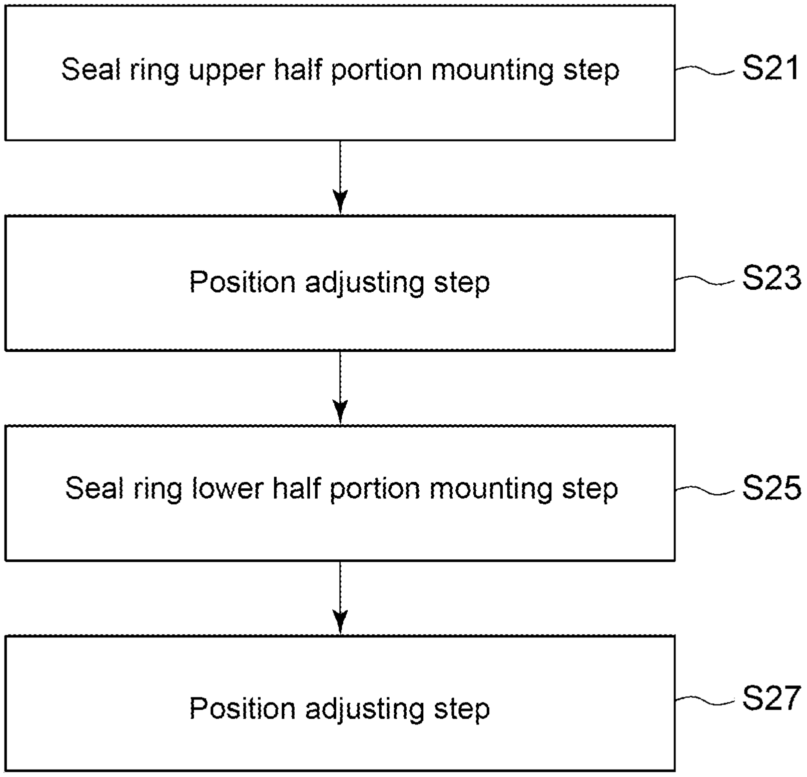
FIG. 6 is a flowchart showing a procedure in a method for assembling a turbine according to the present embodiment.

FIG. 6 is a flowchart showing a procedure in the method for assembling the turbine according to the present embodiment.

The method for assembling the turbine according to the present embodiment includes a seal ring upper half portion mounting step S21, a position adjusting step S23, a seal ring lower half portion mounting step S25, and a position adjusting step S27.

In the method for assembling the turbine according to the present embodiment, the position adjusting step S23 may be performed at any time after the seal ring upper half portion mounting step S21 is performed, regardless of whether the seal ring lower half portion mounting step S25 and the position adjusting step S27 are performed. Likewise, the position adjusting step S27 may be performed at any time after the seal ring lower half portion mounting step S25 is performed, regardless of whether the seal ring upper half portion mounting step S21 and the position adjusting step S23 are performed.

In the following description, in expressing a circumferential position around the axis O, vertically upward is a 12 o'clock position and vertically downward is a 6 o'clock position. Further, as viewed from the upstream side toward the downstream side in the axis O direction, a horizontal right side is a 3 o'clock position and a horizontal left side is a 9 o'clock position.

(Seal Ring Upper Half Portion Mounting Step S21)

In the method for assembling the turbine according to the present embodiment, the seal ring upper half portion mounting step S21 is a step of mounting, on the blade ring upper half portion 52A, the first member 71 (seal ring upper half portion 60A) which is formed with the seal fin 61 by the method for manufacturing the seal ring described above.

Specifically, the seal ring upper half portion mounting step S21 includes mounting the outer peripheral portion 65 of the seal ring upper half portion 60A in the inner peripheral portion of the blade ring upper half portion 52A, as shown in FIG. 3.

Consequently, when the blade ring upper half portion 52A is mounted on the casing upper half portion 51A, the tip portion 63 of the seal fin 61 is the farthest from the axis O in the vicinity of the 12 o'clock position. Therefore, the contact between the tip shroud 34 and the tip portion 63 of each seal fin 61, which is caused by the deformation in the casing 2 that can occur mainly in the vertical direction, can be suppressed while suppressing the amount of the leaked steam passing through the minute gap between the tip shroud 34 and the tip portion 63 of each seal fin 61.

(Seal Ring Lower Half Portion Mounting Step S25)

In the method for assembling the turbine of the present embodiment, the seal ring lower half portion mounting step S25 is a step of mounting, on the blade ring lower half portion 52B, the second member 72 (seal ring lower half portion 60B) which is formed with the seal fin 61 by the method for manufacturing the seal ring described above.

Specifically, the seal ring lower half portion mounting step S25 includes mounting the outer peripheral portion 65 of the seal ring lower half portion 60B in the inner peripheral portion of the blade ring lower half portion 52B, as shown in FIG. 3.

Consequently, when the blade ring lower half portion 52B is mounted on the casing lower half portion 51B, the tip portion 63 of the seal fin 61 is the farthest from the axis O in the vicinity of the 6 o'clock position. Therefore, the contact between the tip shroud 34 and the tip portion 63 of each seal fin 61, which is caused by the deformation in the casing 2 that can occur mainly in the vertical direction, can be suppressed while suppressing the amount of the leaked steam passing through the minute gap between the tip shroud 34 and the tip portion 63 of each seal fin 61.

(Position Adjusting Step S23 and Position Adjusting Step S27)

In the method for assembling the turbine of the present embodiment, the position adjusting step S23 is a step of adjusting the circumferential position of the seal ring upper half portion 60A with respect to the blade ring upper half portion 52A such that a positional difference 43 between a circumferential end surface 53*a* of the blade ring upper half portion 52A and the both end portions 71*a*, 71*b* of the seal ring upper half portion 60A is the same on one side and another side in the circumferential direction.

In the method for assembling the turbine of the present embodiment, the position adjusting step S27 is a step of adjusting a circumferential position of the seal ring lower half portion 60B with respect to the blade ring lower half portion 52B such that a positional difference 44 between the circumferential end surface 53*a* of the blade ring lower half portion 52B and the both end portions 72*a*, 72*b* of the seal ring lower half portion 60B is the same on the one side and the another side in the circumferential direction.

Figure 7:
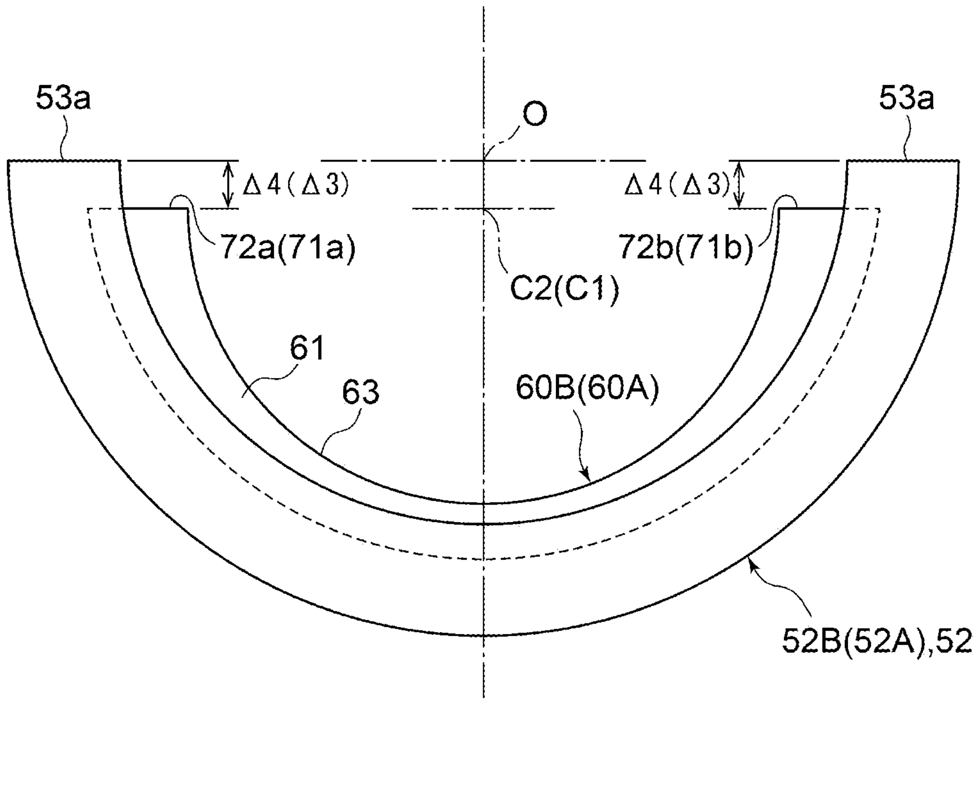
FIG. 7 is a schematic view of a blade ring lower half portion and a seal ring lower half portion attached to the blade ring lower half portion, as viewed from the axis O direction.

FIG. 7 is a schematic view of the blade ring lower half portion 52B and the seal ring lower half portion 60B attached to the blade ring lower half portion 52B, as viewed from the axis O direction.

Although the top and bottom are reversed, a case where the blade ring upper half portion 52A and the seal ring upper half portion 60A attached to the blade ring upper half portion 52A are viewed from the axis O direction is also similar to FIG. 7, and thus the relationship between the blade ring upper half portion 52A and the seal ring upper half portion 60A will also be described with reference to FIG. 7.

The position adjusting step S27 of the present embodiment includes adjusting such that the above-described positional difference 44 is the same on the one side and the another side in the circumferential direction, by appropriately moving the circumferential position of the seal ring lower half portion 60B with respect to the blade ring lower half portion 52B after the seal ring lower half portion 60B is mounted on the blade ring lower half portion 52B, as shown in FIG. 7. Consequently, when the blade ring lower half portion 52B is mounted on the casing lower half portion 51B, the tip portion 63 of the seal fin 61 is the farthest from the axis O at the 6 o'clock position. Therefore, the contact between the tip shroud 34 and the tip portion 63 of each seal fin 61, which is caused by the deformation in the casing 2 that can occur mainly in the vertical direction, can be suppressed while suppressing the amount of the leaked steam passing through the minute gap between the tip shroud 34 and the tip portion 63 of each seal fin 61.

The above-described positional difference 44 is equal to the above-described second offset amount Δ2.

Likewise, the position adjusting step S23 of the present embodiment includes adjusting such that the above-described positional difference 43 is the same on the one side and the another side in the circumferential direction, by appropriately moving the circumferential position of the seal ring upper half portion 60A with respect to the blade ring upper half portion 52A after the seal ring upper half portion 60A is mounted on the blade ring upper half portion 52A. Consequently, when the blade ring upper half portion 52A is mounted on the casing upper half portion 51A, the tip portion 63 of the seal fin 61 is the farthest from the axis O at the 12 o'clock position. Therefore, the contact between the tip shroud 34 and the tip portion 63 of each seal fin 61, which is caused by the deformation in the casing 2 that can occur mainly in the vertical direction, can be suppressed while suppressing the amount of the leaked steam passing through the minute gap between the tip shroud 34 and the tip portion 63 of each seal fin 61.

The above-described positional difference 43 is equal to the above-described first offset amount Δ1.

Further, since the method for assembling the turbine of the present embodiment includes the position adjusting step S23 and the position adjusting step S27, the circumferential positions of the first member 71 and the second member 72 are easily managed in the turbine assembling process.

(As to Steam Turbine 1)

The steam turbine 1 according to at least one embodiment of the present disclosure, includes the blade ring upper half portion 52A, the blade ring lower half portion 52B, and the circular seal ring 60. The seal ring 60 includes a first member 71 (seal ring upper half portion 60A) attached to the blade ring upper half portion 52A, having the semi-circular shape, and formed with the seal fin 61 in the inner peripheral portion 74, and the second member 72 (seal ring lower half portion 60B) attached to the blade ring lower half portion 52B, having the semi-circular shape, and formed with the seal fin 61 in the inner peripheral portion 74. The first member 71 and the second member 72 are attached to the blade ring upper half portion 52A and the blade ring lower half portion 52B in the state where the both end portions 71*a*, 71*b*, 72*a*, 72*b* of the first member 71 and the second member 72 are spaced apart from each other. The space between the end portions 71*a*, 72*a* on the one side of the both end portions 71*a*, 71*b*, 72*a*, 72*b* of the first member 71 and the second member 72 is the same as the space between the end portions 71*b*, 72*b* on the another side.

For example, in the state of being attached to the steam turbine 1 according to an embodiment, a vertical separation distance between the seal fin 61 of the first member 71 (seal ring upper half portion 60A) and the seal fin 61 of the second member 72 (seal ring lower half portion 60B) is larger than the diameter of the seal fin 61 processed into the perfect circular shape. Therefore, even if the deformation in the casing occurs mainly in the vertical direction due to the influence of gravity or heat, it is possible to decrease the possibility of the contact between the tip end portion (tip shroud 34) of the turbine rotor blade 30 and the tip portion 63 of each seal fin 61.

That is, with the steam turbine 1 according to an embodiment, it is possible to decrease the size of the minute gap between the tip shroud 34 and the tip portion 63 of each seal fin 61 while reducing the possibility of the contact between the tip shroud 34 and the tip portion 63 of each seal fin 61, and it is possible to improve the performance of the steam turbine 1.

The present disclosure is not limited to the above-described embodiments, and also includes an embodiment obtained by modifying the above-described embodiments or an embodiment obtained by combining these embodiments as appropriate.

The contents described in the above embodiments would be understood as follows, for instance.

(1) A method for manufacturing a seal ring according to at least one embodiment of the present disclosure is a method for manufacturing a circular seal ring 60, including: a step (inner peripheral portion processing step S9) of forming a seal fin 61 by turning an inner peripheral portion 74 of a first member 71 and a second member 72 each having a semi-circular shape in a state where both end portions 71*a*, 71*b*, 72*a*, 72*b* of each of the first member 71 and the second member 72 are in contact with each other; and a step (outer peripheral portion processing step S5) of turning an outer peripheral portion 73 of the first member 71 and the second member 72 in a state where the both end portions 71*a*, 71*b*, 72*a*, 72*b* of each of the first member 71 and the second member 72 are spaced apart from each other.

In attaching the first member 71 and the second member 72 processed by the above method (1) to the casing 2, the first member 71 and the second member 72 are preferably attached to the casing in the state where the end portions 71*a*, 71*b*, 72*a*, 72 of each of the first member 71 and the second member 72 are spaced apart by the same space as the space between the both end portions 71*a*, 71*b*, 72*a*, 72 set in the outer peripheral portion processing step S5. Consequently, in the state where the first member 71 and the second member 72 are attached to the casing 2, the outer peripheral portion 73 of the first member 71 and the second member 72 has the perfect circular shape, and the inner peripheral portion 74 of the first member 71 and the second member 72 has the flattened shape in which the major axis and the minor axis are different by the above-described space.

That is, with the above method (1), the first member 71 and the second member 72 are obtained in which the inner peripheral portion 74 of the first member 71 and the second member 72 has the flattened shape in the state where the first member 71 and the second member 72 are attached to the casing 2.

(2) In some embodiments, in the above method (1), the step (inner peripheral portion processing step S9) of forming the seal fin may include forming the seal fin 61 such that an angle θ between one side surface 64*u* of both side surfaces 64*u*, 64*d* of the seal fin 61 and an inner peripheral surface 66 of the seal ring 60 where the seal fin 61 is formed makes an acute angle as viewed from a circumferential direction of the seal ring 60.

The seal fin 61 in which the angle θ between the one side surface 64*u* of the both side surfaces 64*u*, 64*d* of the seal fin 61 and the inner peripheral surface 66 of the seal ring 60 where the seal fin 61 is formed makes the acute angle as viewed from the circumferential direction of the seal ring 60 is referred to as, for example, a slant fin. By using such slant fin, it is possible to reduce the amount of the leaked steam flowing through the minute gap between the tip shroud 34 and the tip portion 63 of each seal fin 61.

With the above method (2), when the inner peripheral portion 74 of the first member 71 and the second member 72 is turned (inner peripheral portion processing step S9), since the inner peripheral portion 74 of the first member 71 and the second member 72 is turned in the state where the both end portions 71*a*, 71*b*, 72*a*, 72*b* of each of the first member 71 and the second member 72 are in contact with each other, the inner peripheral portion 74 (thrust fin) of the first member 71 and the second member 72 has the perfectly circular shape in the state where the both end portions 71*a*, 71*b*, 72*a*, 72*b* of the first member 71 and the second member 72 are in contact with each other. Consequently, when the inner peripheral portion 74 is processed, the relative positions of the cutting tool and the first member 71 and the second member 72 change in the radial direction just by the feed of the cutting tool required for processing, and thus the formed thrust fin (second seal fin 61B) does not unnecessarily interfere with the cutting tool.

Therefore, with the above method (2), it is possible to form the slant fin.

(3) In some embodiments, in the above method (1) or (2), the step (outer peripheral portion processing step S5) of turning the outer peripheral portion 73 preferably includes turning the outer peripheral portion 73 of the first member 71 and the second member 72, which respectively have a center of curvature C1 and a center of curvature C2 disposed to be offset from a turning center Ct during the turning to a radially outer side around the turning center Ct.

With the above method (3), the outer peripheral portion 73 of the first member 71 and the second member 72 can be processed to have the perfect circular shape in the state where the center of curvature C1 of the first member 71 and the center of curvature C2 of the second member 72 are offset as described above.

(4) In some embodiments, in the above method (3), the step (outer peripheral portion processing step S5) of turning the outer peripheral portion 73 may include turning the outer peripheral portion 73 of the first member 71 which has the center of curvature C1 disposed to be offset from the above-described turning center Ct to the radially outer side by a first offset amount Δ1 and the second member 72 which has the center of curvature C2 disposed to be offset from the above-described turning center Ct to the radially outer side by a second offset amount Δ2 different from the first offset amount Δ1.

With the above method (4), the outer peripheral portion 73 of the first member 71 and the second member 72 can be processed to have the perfect circular shape in the state where the center of curvature C1 of the first member 71 and the center of curvature C2 of the second member 72 are offset as described above.

(5) In some embodiments, in any of the above methods (1) to (4), the step (outer peripheral portion processing step S5) of turning the outer peripheral portion 73 may include turning the outer peripheral portion 73 of the first member 71 and the second member 72 disposed such that a space between end portions 71*a*, 72*a* on one side of the both end portions 71*a*, 71*b*, 72*a*, 72*b* of each of the first member 71 and the second member 72 is the same as a space between end portions 71*a*, 72*a* on another side.

With the above method (5), the outer peripheral portion 73 of the first member 71 and the second member 72 can be processed to have the perfect circular shape in the state where the first member 71 and the second member 72 are disposed as described above.

(6) In some embodiments, in any of the above methods (1) to (5), the step (outer peripheral portion processing step S5) of turning the outer peripheral portion 73 may include turning the outer peripheral portion 73 of the first member 71 and the second member 72 in a state where a spacer 75 is inserted between end portions 71*a*, 72*a* on one side of the both end portions 71*a*, 71*b*, 72*a*, 72*b* of each of the first member 71 and the second member 72 and between end portions 71*b*, 72*b* on another side.

With the above method (6), the size of the space between the both end portions 71*a*, 71*b*, 72*a*, 72*b* of each of the first member 71 and the second member 72 can be set by the spacer 75, making it easy to set the size of the space.

(7) In some embodiments, in any of the above methods (1) to (6), the method for manufacturing the seal ring may include a step (spacer inserting step S3) of inserting a spacer 75 between end portions 71*a*, 72*a* on one side of the both end portions 71*a*, 71*b*, 72*a*, 72*b* of each of the first member 71 and the second member 72 and between end portions 71*b*, 72*b* on another side, prior to the step (outer peripheral portion processing step S5) of turning the outer peripheral portion 73; and a step (spacer removing step S7) of removing the spacer 75 and bringing the both end portions 71*a*, 71*b*, 72*a*, 72*b* of each of the first member 71 and the second member 72 into contact with each other, after the step (outer peripheral portion processing step S5) of turning the outer peripheral portion 73. The step (inner peripheral portion processing step S9) of forming the seal fin 61 may be performed after the step (spacer removing step S7) of bringing the both end portions 71*a*, 71*b*, 72*a*, 72*b* into contact with each other.

As in the above method (7), the outer peripheral portion 73 may be turned prior to the formation of the seal fin 61.

(8) In some embodiments, in any of the above methods (1) to (6), the method for manufacturing the seal ring may include a step (spacer inserting step S3) of inserting a spacer 75 between end portions 71*a*, 72*a* on one side of the both end portions 71*a*, 71*b*, 72*a*, 72*b* of each of the first member 71 and the second member 72 and between end portions 71*b*, 72*b* on another side, after the step (inner peripheral portion processing step S9) of forming the seal fin 61. The step (outer peripheral portion processing step S5) of turning the outer peripheral portion 73 may be performed after the step (spacer inserting step S3) of inserting the spacer 75. As in the above method (8), the outer peripheral portion 73 may be turned after the seal fin 61 is formed.

(9) A method for assembling a turbine according to at least one embodiment of the present disclosure, includes: a step (seal ring upper half portion mounting step S21) of mounting, on a blade ring upper half portion 52A, the first member 71 formed with the seal fin 61 by any of the above methods (1) to (8); and a step (seal ring lower half portion mounting step S25) of mounting, on a blade ring lower half portion 52B, the second member 72 formed with the seal fin 61 by any of the above methods (1) to (8).

With the above method (9), the first member 71 (seal ring upper half portion 60A) can be mounted on the blade ring upper half portion 52A and the second member 72 (seal ring lower half portion 60B) can be mounted on the blade ring lower half portion 52B.

In attaching, to the casing 2, the blade ring upper half portion 52A and the blade ring lower half portion 52B on which the first member 71 and the second member 72 are mounted by the above method (9), the blade ring upper half portion 52A and the blade ring lower half portion 52B mounted with the first member 71 and the second member 72 are preferably attached to the casing 2 in the state where the both end portions 71*a*, 71*b*, 72*a*, 72*b* of each of the first member 71 and the second member 72 are spaced apart from each other. Consequently, the extension direction of the major axis of the inner peripheral portion 74 of the first member 71 and the second member 72 approaches the vertical direction. Therefore, even if the deformation in the casing 2 occurs mainly in the vertical direction due to the influence of gravity or heat, it is possible to decrease the possibility of the contact between the tip end portion (tip shroud 34) of the turbine rotor blade 30 and the tip portion 63 of each seal fin 61.

That is, with the above method (9), it is possible to decrease the size of the minute gap between the tip shroud 34 and the tip portion 63 of each seal fin 61 while reducing the possibility of the contact between the tip shroud 34 and the tip portion 63 of each seal fin 61, and it is possible to improve the performance of the steam turbine 1.

(10) In some embodiments, in the above method (9), the method for assembling the turbine may include: a step (position adjusting step S23) of adjusting a position of the first member 71 (seal ring upper half portion 60A) in a circumferential direction with respect to the blade ring upper half portion 52A such that a positional difference 43 between a circumferential end surface 53*a* of the blade ring upper half portion 52A and the both end portions 71*a*, 71*b* of the first member 71 is the same on one side and another side in the circumferential direction; and a step (position adjusting step S27) of adjusting a position of the second member 72 (seal ring lower half portion 60B) in the circumferential direction with respect to the blade ring lower half portion 52B such that a positional difference 44 between the circumferential end surface 53*a* of the blade ring lower half portion 52B and the both end portions 72*a*, 72*b* of the second member 72 is the same on the one side and the another side in the circumferential direction.

With the above method (10), the circumferential positions of the first member 71 and the second member 72 are easily managed in the turbine assembling process.

(11) A turbine (steam turbine 1) according to at least one embodiment of the present disclosure, includes: a blade ring upper half portion 52A; a blade ring lower half portion 52B; and a circular seal ring 60. The seal ring 60 includes: a first member 71 (seal ring upper half portion 60A) attached to the blade ring upper half portion 52A, having a semi-circular shape, and formed with a seal fin 61 in an inner peripheral portion 74; and a second member 72 (seal ring lower half portion 60B) attached to the blade ring lower half portion 52B, having a semi-circular shape, and formed with the seal fin 61 in the inner peripheral portion 74. The first member 71 and the second member 72 are attached to the blade ring upper half portion 52A and the blade ring lower half portion 52B in a state where both end portions 71*a*, 71*b*, 72*a*, 72*b* of each of the first member 71 and the second member 72 are spaced apart from each other. A space between end portions 71*a*, 72*a* on one side of the both end portions 71*a*, 71*b*, 72*a*, 72*b* of each of the first member 71 and the second member 72 is the same as a space between end portions 71*b*, 72*b* on another side.

For example, if the seal fin 61 is processed into the perfect circular shape in the state where the both end portions 71*a*, 71*b*, 72*a*, 72*b* of the first member 71 (seal ring upper half portion 60A) and the second member 72 (seal ring lower half portion 60B) are in contact with each other, the vertical separation distance between the seal fin 61 of the first member 71 and the seal fin 61 of the second member 72 is larger than the diameter of the seal fin 61 processed into the perfect circular shape, in the state being attached to the turbine (steam turbine 1) having the above configuration (11). Therefore, even if the deformation in the casing 2 occurs mainly in the vertical direction due to the influence of gravity or heat, it is possible to decrease the possibility of the contact between the tip end portion (tip shroud 34) of the turbine rotor blade 30 and the tip portion 63 of each seal fin 61.

That is, with the above configuration (11), it is possible to decrease the size of the minute gap between the tip shroud 34 and the tip portion 63 of each seal fin 61 while reducing the possibility of the contact between the tip shroud 34 and the tip portion 63 of each seal fin 61, and it is possible to improve the performance of the steam turbine 1.

REFERENCE SIGNS LIST

1 Steam turbine
2 Casing
51 Casing body
51A Casing upper half portion
51B Casing lower half portion
52 Blade ring
52A Blade ring upper half portion
52B Blade ring lower half portion
53*a* Circumferential end surface
60 Seal ring
60A Seal ring upper half portion
60B Seal ring lower half portion
61 Seal fin
62 Base portion
63 Tip portion
66 Inner peripheral surface
71 First member
71*a*, 71*b* Both end portion
72 Second member
72*a*, 72*b* Both end portion
73 Outer peripheral portion
74 Inner peripheral portion
75 Spacer

The invention claimed is:

1. A method for manufacturing a circular seal ring, comprising:

a step of forming a seal fin by turning an inner peripheral portion of a first member and a second member each having a semi-circular shape in a state where both end portions of each of the first member and the second member are in contact with each other; and a step of turning an outer peripheral portion of the first member and the second member in a state where the both end portions of each of the first member and the second member are spaced apart from each other.

2. The method for manufacturing the seal ring according to claim 1, wherein the step of forming the seal fin includes forming the seal fin such that an angle between one side surface of both side surfaces of the seal fin and an inner peripheral surface of the seal ring where the seal fin is formed makes an acute angle as viewed from a circumferential direction of the seal ring.

3. The method for manufacturing the seal ring according to claim 1, wherein the step of turning the outer peripheral portion includes turning the outer peripheral portion of the first member and the second member each of which has a center of curvature disposed to be offset from a turning center during the turning to a radially outer side around the turning center.

4. The method for manufacturing the seal ring according to claim 3, wherein the step of turning the outer peripheral portion includes turning the outer peripheral portion of the first member which has the center of curvature disposed to be offset from the turning center to the radially outer side by a first offset amount and the second member which has the center of curvature disposed to be offset from the turning center to the radially outer side by a second offset amount different from the first offset amount.

5. The method for manufacturing the seal ring according to claim 1, wherein the step of turning the outer peripheral portion includes turning the outer peripheral portion of the first member and the second member disposed such that a space between end portions on one side of the both end portions of each of the first member and the second member is the same as a space between end portions on another side.

6. The method for manufacturing the seal ring according to a claim 1, wherein the step of turning the outer peripheral portion includes turning the outer peripheral portion of the first member and the second member in a state where a spacer is inserted between end portions on one side of the both end portions of each of the first member and the second member and between end portions on another side.

7. The method for manufacturing the seal ring according to claim 1, comprising:

a step of inserting a spacer between end portions on one side of the both end portions of each of the first member and the second member and between end portions on another side, prior to the step of turning the outer peripheral portion; and a step of removing the spacer and bringing the both end portions of each of the first member and the second member into contact with each other, after the step of turning the outer peripheral portion, wherein the step of forming the seal fin is performed after the step of bringing the both end portions into contact with each other.

8. The method for manufacturing the seal ring according to claim 1, comprising:

a step of inserting a spacer between end portions on one side of the both end portions of each of the first member and the second member and between end portions on another side, after the step of forming the seal fin, wherein the step of turning the outer peripheral portion is performed after the step of inserting the spacer.

9. A method for assembling a turbine, comprising:

a step of mounting, on a blade ring upper half portion, the first member formed with the seal fin; and a step of mounting, on a blade ring lower half portion, the second member formed with the seal fin by the method for manufacturing the seal ring according to claim 1.

10. The method for assembling the turbine according to claim 9, comprising:

a step of adjusting a position of the first member in a circumferential direction with respect to the blade ring upper half portion such that a positional difference between a circumferential end surface of the blade ring upper half portion and the both end portions of the first member is the same on one side and another side in the circumferential direction; and a step of adjusting a position of the second member in the circumferential direction with respect to the blade ring lower half portion such that a positional difference between the circumferential end surface of the blade ring lower half portion and the both end portions of the second member is the same on the one side and the another side in the circumferential direction.

11. A turbine, comprising:

a blade ring upper half portion;

a blade ring lower half portion; and a circular seal ring, wherein the seal ring includes:

a first member attached to the blade ring upper half portion, having a semi-circular shape extending over half the circumference of the seal ring, and formed with a seal fin in an inner peripheral portion; and a second member attached to the blade ring lower half portion, having a semi-circular shape extending over half the circumference of the seal ring, and formed with the seal fin in the inner peripheral portion, wherein the first member and the second member are attached to the blade ring upper half portion and the blade ring lower half portion in a state where both end portions of each of the first member and the second member are spaced apart from each other, wherein a virtual circle defined by tip portions of the seal fins is configured such that a major axis thereof extends in a vertical direction and a minor axis thereof extends in a horizontal direction when viewed in an axial direction of the turbine, and wherein a space between end portions on one side of the both end portions of each of the first member and the second member is the same as a space between end portions on another side.

* * * * *